(12) United States Patent
Cardamone et al.

(10) Patent No.: US 7,264,637 B2
(45) Date of Patent: Sep. 4, 2007

(54) METHOD OF INHIBITING THE BURNING OF NATURAL FIBERS, SYNTHETIC FIBERS, OR MIXTURES THEREOF, OR FABRIC OR YARN COMPOSED OF NATURAL FIBERS, SYNTHETIC FIBERS, OR MIXTURES THEREOF, AND PRODUCTS PRODUCED BY SUCH METHODS

(75) Inventors: Jeanette M. Cardamone, Lafayette Hill, PA (US); Anand Purshottam Kanchager, Webster, MA (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 38 days.

(21) Appl. No.: 11/211,828

(22) Filed: Aug. 25, 2005

(65) Prior Publication Data

US 2006/0075574 A1 Apr. 13, 2006

Related U.S. Application Data

(60) Provisional application No. 60/605,937, filed on Aug. 31, 2004.

(51) Int. Cl.
*D06M 23/00* (2006.01)
(52) U.S. Cl. ............. 8/115.51; 8/181; 8/194; 8/129; 252/8.61; 252/608; 428/920; 442/136; 442/147; 442/152; 442/164
(58) Field of Classification Search .......... 8/115, 8/115.51, 181, 194, 129; 525/433; 252/8.61, 252/608; 442/136, 147, 152, 164; 428/920
See application file for complete search history.

(56) References Cited

U.S. PATENT DOCUMENTS

| | | | | |
|---|---|---|---|---|
| 3,325,450 A | * | 6/1967 | Holub | 528/26 |
| 3,888,820 A | * | 6/1975 | Touval et al. | 524/467 |
| 4,586,997 A | | 5/1986 | Lee | 525/426 |
| 4,670,497 A | | 6/1987 | Lee | 524/377 |
| 4,701,511 A | | 10/1987 | Valenty | 528/26 |
| 4,795,680 A | | 1/1989 | Rich et al. | 428/450 |
| 4,829,131 A | | 5/1989 | Lee | 525/426 |
| 4,903,358 A | | 2/1990 | Creyf et al. | 5/459 |
| 4,916,194 A | * | 4/1990 | Policastro et al. | 525/433 |
| 4,973,645 A | | 11/1990 | Lee | 528/26 |

(Continued)

FOREIGN PATENT DOCUMENTS

JP 401292120 A * 11/1989

OTHER PUBLICATIONS www.swicofil.com from the Internet archives published on Feb. 5, 2004.*

(Continued)

*Primary Examiner*—Lorna M. Douyon
*Assistant Examiner*—Tri Nguyen
(74) *Attorney, Agent, or Firm*—John D. Fada; G. Byron Stover

(57) ABSTRACT

Methods of inhibiting the burning of natural fibers (e.g., wool, wool fibers, animal hair, cotton), synthetic fibers (e.g., acetate, nylon, polyester, viscose rayon), or blends thereof (e.g., wool/cotton blends), or fabrics or yarns composed of natural fibers, synthetic fibers, or blends thereof, involving treating the fibers (or fabrics or yarns) with polyamic acid or at least one polyimidesiloxane (PISi) or mixtures of polyamic acid and at least one polyimidesiloxane. Also products produced by such methods.

14 Claims, 15 Drawing Sheets
(13 of 15 Drawing Sheet(s) Filed in Color)

U.S. PATENT DOCUMENTS

| | | | |
|---|---|---|---|
| 5,206,337 A | 4/1993 | Takeda et al. | 528/313 |
| 6,632,523 B1 | 10/2003 | Rosenfeld et al. | 428/355 |
| 2003/0066603 A1* | 4/2003 | Halladay et al. | 156/329 |

OTHER PUBLICATIONS

Koo et al. "Flammability studies of thermally resistant polymers using cone calomeritry." Fire Mater. 24, 209-218, 2000.*

Benrashid et al. "Synthesis of new siloxane urethane block copolymers and their properties." Polym Sci. Part A, 1994, 32: 1847.*

McGrath, B.E., "The Application of Siloxane Modified Polyimides as High Performance Textile Coatings", unpublished M.S. Thesis, Virginia Polytechnic Instit. And State University, May 1989.

Yoon, T.H., et al., "Adhesion Behavior of Thermoplastic Polyimides and Poly(imide-siloxane) Segmented Copolymers: Influence of Test Temperatures", *J. Adhesion*, vol. 39, pp. 15-27, 1992.

Summers, J.D., et al., "Synthesis and Solution Imidization Studies of Soluble Poly (Imide Siloxane) Segmented Copolymers", *SAMPE Proceedings*, Anaheim, CA, vol. 32, pp. 613-623, Apr. 6-9, 1987.

Stern, S.A., et al., "Structure/Permeability Relationships of Silicon-Containing Polyimides", *J. Membrane Science*, vol. 49, pp. 1-14, 1990.

McGrath, J.E., et al., "Synthesis and Characterization of Segmented Polyimide-Polyorganosiloxane Copolymers", *Advances in Polymer Science*, vol. 140, pp. 61-105, 1999.

Lee, Y.J., et al., "Adhesive and Thermo-Mechanical Behavior of Phosphorus-Containing Thermoplastic Polyimides", *J. Adhesion*, vol. 55, pp. 165-177, 1995.

Bott, R.H., et al., "Poly(Imide-Siloxane) Segmented Copolymer Structural Adhesives Prepared by Bulk and Solution Thermal Imidization",$33^{rd}$ *Internation SAMPE Symposium*, pp. 1177-1187, Mar. 7-10, 1988.

Arnold, C.A., et al., "Soluble Polyimide Homopolymers and Poly(Siloxane Imide) Segmented Copolymers of Imporove Dielectric Behavior", $3^{rd}$ *International SAMPE Electronics Conference*, pp. 198-208, Jun. 20-22, 1989.

Bott, R.H., et al., "Synthesis and Characteristics of Novel Poly (Imide Siloxane) Segmented Copolymers", *J. Adhesion*, vol. 23, pp. 67-82, 1987.

Kaltenecker-Commercon, J.M., et al., "Water Resistance of Poly(Imide-Siloxane) Adhesives: Diffusion Coefficients by Gravimetric Sorption", *J. Adhesion*, vol. 44, pp. 85-102, 1994.

Bott, R.H., et al., "Poly(Imide-Siloxane) Segmented Copolymer Structural Adhesives Prepared by Bulk and Solution Thermal Imidization",$33^{rd}$ *Internation SAMPE Symposium*, pp. 1177-1187, Mar. 7-10, 1988.

* cited by examiner

METHOD OF INHIBITING THE BURNING OF NATURAL FIBERS, SYNTHETIC FIBERS, OR MIXTURES THEREOF, OR FABRIC OR YARN COMPOSED OF NATURAL FIBERS, SYNTHETIC FIBERS, OR MIXTURES THEREOF, AND PRODUCTS PRODUCED BY SUCH METHODS

REFERENCE TO RELATED APPLICATION

This application claims the benefit of U.S. Provisional Application No. 60/605,937, filed 31 Aug. 2004, which is incorporated herein by reference in its entirety.

BACKGROUND OF THE INVENTION

The present invention concerns methods of inhibiting the burning of natural fibers (e.g., wool, wool fibers, animal hair, cotton), synthetic fibers (e.g., acetate, nylon, polyester, viscose rayon), or blends thereof (e.g., wool/cotton blends), or fabrics or yarns composed of natural fibers, synthetic fibers, or blends thereof, involving treating the fibers (or fabrics or yarns) with polyamic acid or at least one polyimidesiloxane or mixtures of polyamic acid and at least one polyimidesiloxane. In addition, the present invention concerns products produced by such methods.

Wool is natural protein fiber that self-extinguishes when exposed to a flame. Hence wool can be used in applications that require flame-resistance. Wool is used in airplane interiors, such as seat covers, sidewall panels, and carpets, and fabrics used in pillow covers and blankets. Wool is also a preferred fiber for uniforms worn by military personnel because of its comfort properties such as high moisture regain.

Wool may have to be made flame proof to be used in certain applications such as protective clothing worn while handling molten metals, apparel worn by racecar drivers, and aircraft interiors. Wool fabrics can be made to resist burning by blending with fibers such as Aramid (Nomex™ and Kevlar™) or chemical treatment of wool. Disadvantages of blending with Aramid include poor abrasion resistance, difficulty in dyeing, poor UV and light resistance, higher rates of heat release, and higher cost. Conventional chemical treatments to confer flame resistance to wool include treatment with the flame retarding agents applied to cotton, such as salts of borate, phosphate, metals, and tetrakishydroxymethyl phosphonium, and titanium compounds. Zirconium complexes under the trademark Zirpro™, issued by the International Wool Secretariat, are one of the successful flame retardants for wool. Many modifications of the Zirpro™ process according to specific needs have been made. For example, tetrabromophthalic acid (TBPA) is used along with Zirpro™ to obtain low heat release wool. However, zirconium salts have the environmental disadvantage of zirconium being a heavy metal.

Properties of wool such as easy dyeability, inherent resistance to burning, warmth, and resilience make it a preferred fiber even today. Zirpro™ is the only commercially available flame retardant treatment method for wool. However, heavy metals salts are used in the process and not all compounds required for the treatment are easily available. Hence an alternative treatment to make wool flame proof is needed.

SUMMARY OF THE INVENTION

In accordance with the present invention there is provided methods of inhibiting the burning of natural fibers (e.g., wool, wool fibers, animal hair, cotton), synthetic fibers (e.g., acetate, nylon, polyester, viscose rayon), or blends thereof (e.g., wool/cotton blends), or fabrics or yarns composed of natural fibers, synthetic fibers, or blends thereof, involving treating the fibers (or fabrics or yarns) with polyamic acid or at least one polyimidesiloxane (PISi) or mixtures of polyamic acid and at least one polyimidesiloxane.

Also in accordance with the present invention, there is provided products made by such methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention concerns methods of inhibiting (resisting) the burning of natural fibers (e.g., wool, wool fibers, animal hair, cotton), synthetic fibers (e.g., acetate, nylon, polyester, viscose rayon), or blends thereof (e.g., wool/cotton blends), or fabrics or yarns composed of natural fibers, synthetic fibers, or blends thereof, involving treating the fibers (or fabric or yarn) with polyamic acid or at least one polyimidesiloxane or mixtures of polyamic acid and at least one polyimidesiloxane. Furthermore, the present invention concerns products made by such methods.

Polyimides are polymers with good mechanical strength and high modulus. Polyimides have a very rigid structure and hence to make polyimides processable flexible groups such as siloxane, ether and amide segments are introduced in the polyimide chain. Polyimidisiloxanes contain siloxane segments in the polyimide chain that make polyimide soluble in solvents. The presence of siloxanes in the polyimide chain imparts good uv light resistance and low surface energy.

Polyimides are step growth or condensation polymers derived from primary diamines and bifunctional carboxylic acid anhydrides. The imide structure can be in the form of linear or heterocyclic units along the chain of the polymer backbone. Aromatic polyimides are difficult to process because of their highly ordered structure resulting in chain rigidity. Hence, in order to make polyimides processable, a soft segment such as polydimethyl siloxane can be included in the polymer chain to form polyimidisiloxanes.

Polyimidisiloxanes can be synthesized via different routes. The classical method is the two-step method in which a polyamic acid is formed by the reaction between the difunctional amine and the difunctional anhydride and an amino alkyl terminated polydimethyl siloxane. In the second step, the polyamic acid when heated in a solvent-cosolvent mixture loses water to form the imide ring in the final product, a polyimidesiloxane copolymer. Other methods of polyimidesiloxane synthesis that can be employed are diisocyanate method, nitro method and diester-diacid method.

Figure 1:
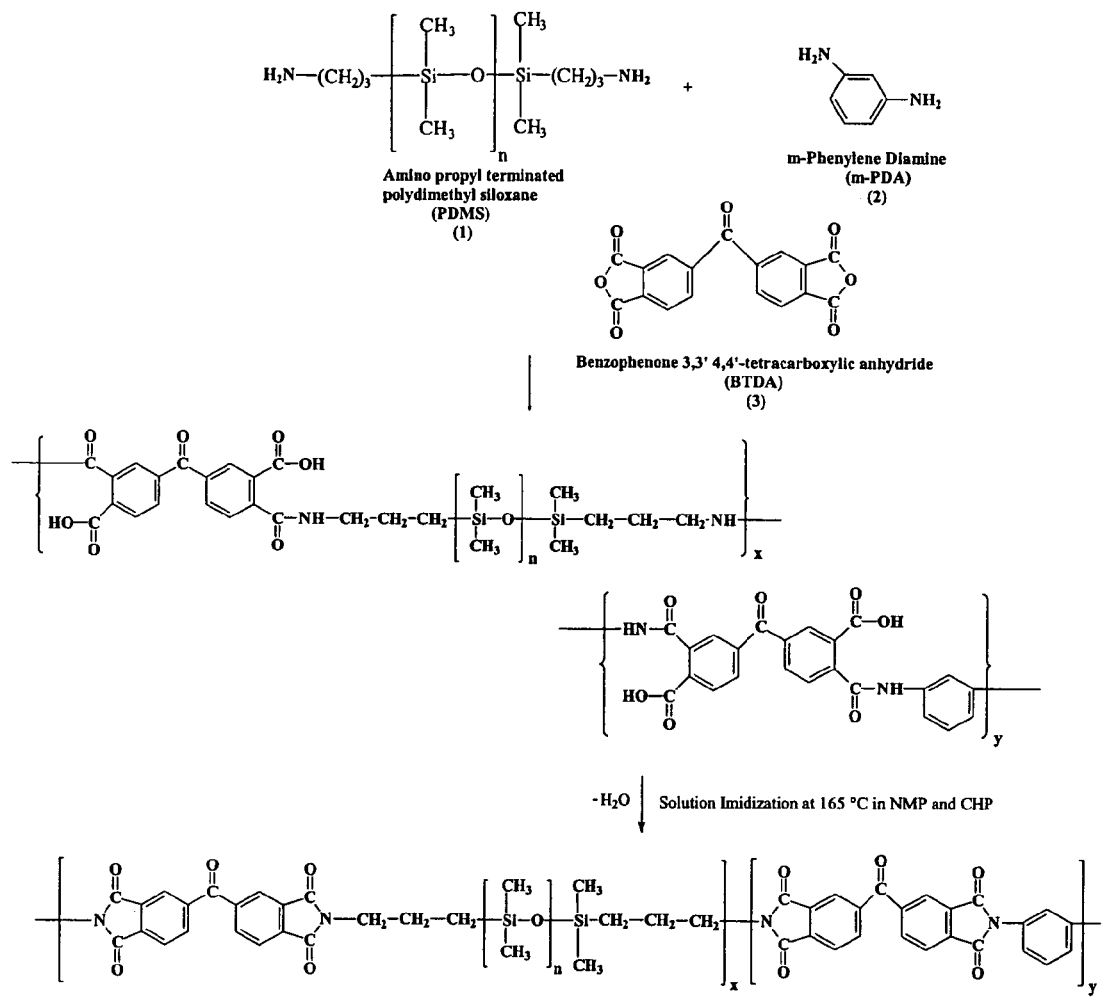
FIG. 1 shows the synthesis of one polyimidesiloxane (PISi-1). In Step 1, polyamic acid was formed by the reaction of m-phenylene diamine (m-PDA) with benzophenone 3,3', 4,4'-tetracarboxylic anhydride (BTDA) and amino propyl terminated polydimethyl siloxane (PDMS); in Step 2, the polyamic acid (PAA) formed was converted to the cyclic form by solution imidization. Solvents used in the synthesis were N,N-dimethyl acetamide (DMAC), N-methyl pyrrolidinone (NMP), tetrahydrofuran (THF) and n-cyclohexyl pyrrolidone (CHP). The values for "n" can be any integer from 1 to 10. The values of x and y can range from 0 to 1 and x+y=1 (in this particular example x=0.1 and y=0.9). The ratio of monomers, BTDA, m-PDA and PDMS is 50:40:10).

For example, PISi-1 may be synthesized as follows (the overall reaction is shown in FIG. 1): In Step 1, polyamic acid was formed by the reaction of m-phenylene diamine (m-PDA) with benzophenone 3,3', 4,4'-tetracarboxylic anhydride (BTDA) and amino propyl terminated polydimethyl siloxane (PDMS). N-methyl pyrrolidinone (NMP) or N,N-dimethyl acetamide (DMAC) were used to dissolve BTDA and m-PDA and tetrahydrofuran (THF) was used to dissolve PDMS. The ratio of NMP/THF for polymer synthesis is generally between about 40: about 60 (e.g., 40:60). In Step 2, the polyamic acid was imidized using a mixture of NMP or DMAC and an azeotropic solvent such as n-cyclohexyl pyrrolidone (CHP) or ortho-dichlorobenzene (DCB). The ratio of NMP or DMAC: CHP is generally between about 80: about 20 (e.g., 80:20). In FIG. 1, the value for "n" (the number of repeat units for PDMS, the siloxane monomer) can be any integer from 1 to 10 according to the supplier's product literature (poly(dimethylsiloxane), aminopropyl terminated—DMS-A12, Gelest, Inc., Morrisville, Pa. 19067). The values of x and y can range from 0 to 1 and x+y=1 (in this particular example x=0.1 and y=0.9).

Figure 2:
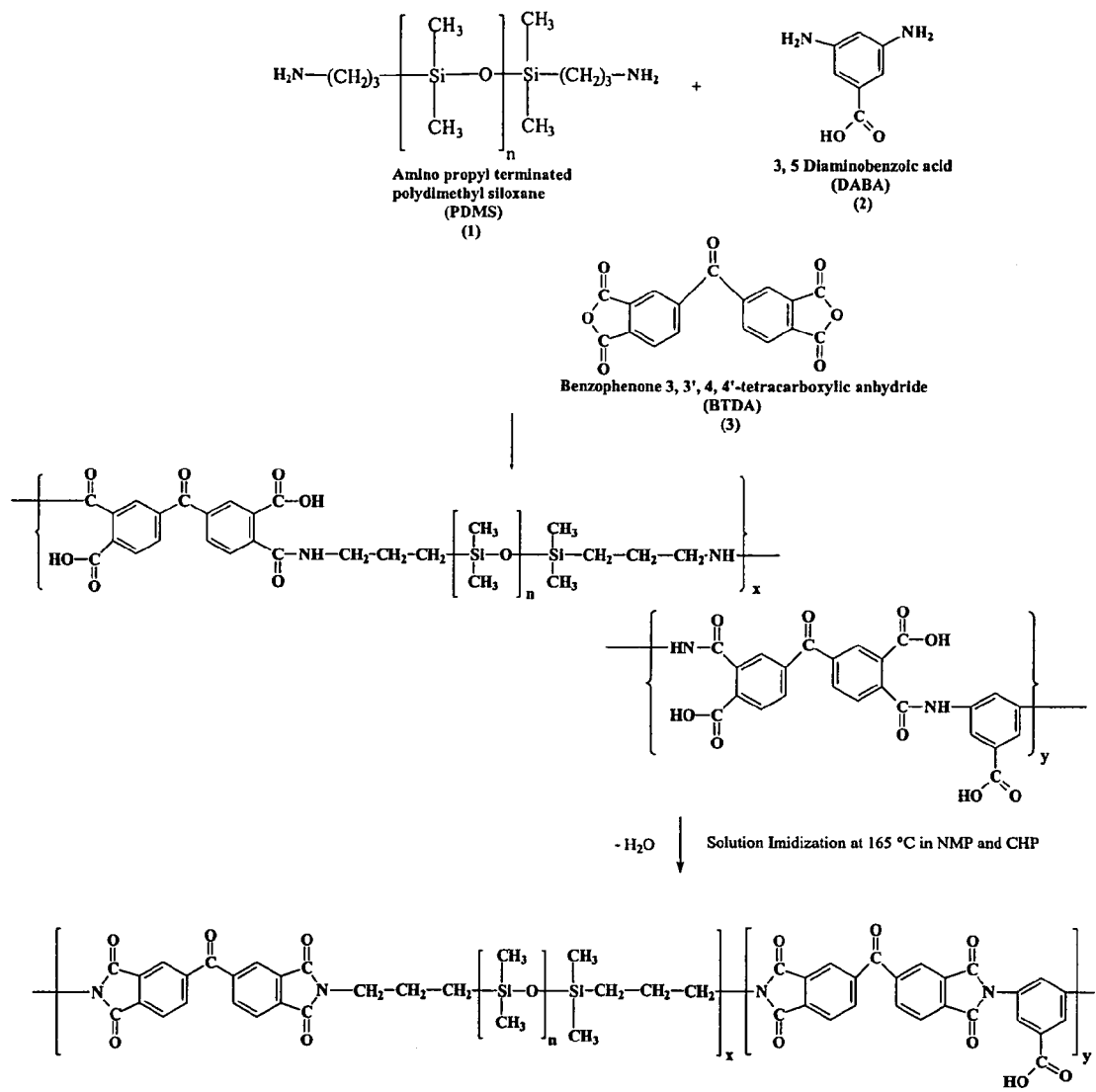
FIG. 2 shows the synthesis of a second polyimidesiloxane (PISi-2). The reaction procedure followed to synthesize polyimidesiloxane was similar to that of polyimidesiloxane (PISi-1); the monomers used in this synthesis were BTDA, 3,5 diaminobenzoic acid (DABA) and aminopropyl terminated polydimethylsiloxane. The values for "n" can be any integer from 1 to 10. The values of x and y can range from 0 to 1 and x+y=1 (in this particular example x=0.1 and y=0.9). The ratio of monomers, BTDA, DABA and PDMS is 50:40:10.

In another example, PISi-2 may be synthesized as follows (the overall reaction is shown in FIG. 2): The reaction procedure followed to synthesize PISi-2 was similar to that of PISi-1 as described above. The monomers used in this synthesis were BTDA, 3,5 diaminobenzoic acid (DABA) and aminopropyl terminated polydimethylsiloxane (PDMS).

The synthesis reaction time for polyamic acid (PAA) is generally between about 8 and about 12 hrs (e.g., 8-12 hrs), preferably between about 8 hrs and about 10 hrs (e.g., 8-10 hrs), more preferably about 8 hrs (e.g., 8 hrs). PAA synthesis reaction temperature is generally between about 20° and about 30° C. (e.g., 20°-30° C.), preferably between about 22° about 28° C. (e.g., 22°-28° C.), more preferably about 25° C. (e.g., 25° C.).

The synthesis reaction time for polyimidesiloxane (PISi) is generally between about 12 and about 24 hrs (e.g., 12-24 hrs), preferably between about 12 hrs and about 18 hrs (e.g., 12-18 hrs), more preferably for about 12 hrs (e.g., 12 hrs). PISi synthesis reaction temperature is generally between about 160° and about 190° C. (e.g., 160°-190° C.), preferably between about 160° and about 175° C. (e.g., 160°-175° C.), more preferably about 165° C. (e.g., 165° C.). The concentration of BTDA is generally between about 0.0229 and about 0.17865 g moles (e.g., 0.0229-0.17865). The concentration of PDMS is generally between about 0.0009 and about 0.0166755 g moles (e.g., 0.0009-0.0166755). The concentration of m-PDA is generally between about 0.0200 and about 0.1500798 g moles (e.g., 0.0200-0.1500798).

To isolate the products, polyamic acid was added dropwise to methanol stirred in a high-speed blender and PAA precipitated immediately from NMP or DMAC. PISi precipitated during solution imidization was isolated from solvents by centrifugation and washed with methanol. The precipitate was then air dried. PAA and PISi may be freeze-milled; for example at about −196° C. (e.g., 196° C.) for about 6 minutes (e.g., 6 min) and 2 repetitions). PAA and for PISi may be ball-milled to grind to a fine powder; for example at about −196° C. (e.g., 196° C.) for about 6 minutes (e.g., 6 min) and 2 repetitions).

PAA and PISi may be applied to, for example, wool fabric using methods known in the art. About 5% owb PAA and PISi may be applied to wool fabric by exhaust with heat at about 98° C. (e.g., 98° C.) for about 30 minutes (e.g., 30 min), pH of about 2.5 (e.g., 2.5). PAA and PISi may be applied to wool fabric by exhaust in the Atlas LP2 Launder-O-Meter: about 5% owb (e.g., 5% owb) with heat at about 100° C. (e.g., 100° C.) for about 60 minutes (e.g., 60 min), pH of about 4 (e.g., 4). With exhaust, the application time is generally between about 30 and about 60 minutes (e.g., 30-60 minutes), preferably for about 30 min (e.g., 30 min); at a temperature of between about 90° and about 100° C. (e.g., 90°-100° C.), preferably at about 98° C. (e.g., 98° C.); the pH is generally between about 2 and about 4 (e.g., 2-4), preferably about 4 (e.g., 4). PAA and PISi may be applied to wool fabric by padding: about 5% owb (e.g., 5% owb)with heat at about 30° C. (e.g., 30° C.)for about 5 minutes (e.g., 5 min), pH of about 2.5 (e.g., 2.5), 2 dips and nips, about 80% (e.g., 80%) fabric take-up. With padding, the dipping and soaking time is generally between about 5 and about 10 minutes (e.g., 5-10 min), preferably for about 10 min (e.g., 10 min); at a temperature of about 25° C. (e.g., 25° C.); the pH is generally between about 2 and about 4 (e.g., 2-4), preferably about 4 (e.g., 4). PAA and PISi may be applied to wool fabric by oven baking: about 5% owb (e.g., 5% owb) with heat at about 130°-about 140° C. (e.g., 130°-140° C.) for about 2 minutes (e.g., 2 min), pH of about 2.5 (e.g., 2.5).

Concentration of PAA or PISi in application baths: With padding the concentration is generally between about 5 and about 15 g/L (e.g., 5-15 g/L), preferably about 10 g/L (e.g., 10 g/L). With exhaust the concentration is generally between about 2 and about 5 g/L (e.g., 2-5 g/L), preferably about 5 g/L (e.g., 5 g/L). The concentration of Triton X additive to PAA and PISi application baths is generally between about 1 and about 2 g/L (e.g., 1-2 g/L), preferably about 1 g/L (e.g., 1 g/L).

Other additives which may be placed in the application baths: urea at a concentration generally between about 2 and about 5 g/L (e.g., 2-5 g/L), preferably about 5 g/L (e.g., 5 g/L); citric acid at a concentration generally between about 2 and about 5 g/L (e.g., 2-5 g/L), preferably about 5 g/L (e.g., 5 g/L); potassium aluminum sulfate (alum) at a concentration generally between about 2 and about 5 g/L (e.g., 2-5 g/L), preferably about 5 g/L (e.g., 5 g/L).

The fibers (e.g., wool, wool fibers, animal hair, cotton), synthetic fibers (e.g., acetate, nylon, polyester, viscose rayon), or blends thereof (e.g., wool/cotton blends), or fabrics or yarns composed of natural fibers, synthetic fibers, or blends thereof, may be treated with at least one polyimidesiloxane (e.g., PISi-1 or PISi-2) by exhaustion or padding or similar methods known in the art. For example, for exhaustion 5% and 10% on weight of fabric (owf) of PISi-1 or PISi-2. In order to apply the PISi-1 it was converted into an emulsion. The emulsion was formed by taking 5 mL Triton X-114, 40 mL $H_2O$, and 5 g PISi-1 slurry obtained after centrifugation of the reaction mixture. This composition was mixed in a Waring blender for 10 to 15 minutes to form an emulsion. This emulsion was weighed out to 5 or 10% owf and brought to bath volume (Liquor Ratio, 1:10 (1 g fabric: 10 g $H_2O$)) for application by exhaustion in the Atlas LP2 Launder-O-Meter by tumbling at 50° C. for polymer PISi-2 and 100° C. for PISi-1 for 60 minutes. PISi-2 was applied by padding as well as by exhaustion. To make the application by padding 10 g/L and 30 g/L was used. Actual volume of application solution in the trough of the padder was 500 mL enough to pad two samples of size 15"×15". The fabric had a wet pick-up 80% so that the amount of polymer actually applied for intended 10% owf was less by 20%, it was 8%.

Conventional flame retardant salts such as antimony oxide, zinc hexaborate, sodium tetraborate, aluminum trihydrate, and magnesium hydroxide were added in some of the individual PISi-2 applications. The salts, 5 g/L, were added to the liquor bath solution in the LP2. Fabrics were soaked with salt and PISi-2 solution for 30 minutes in the LP2 canister before starting the LP2 tumbling treatment of 30 minutes at 50° C. After this exhaust treatment these fabrics were run through the padder at zero pressure to remove excess solution. They were dried in a convection oven at 100° C. for 5 minutes and left in the conditioning chamber overnight for testing for vertical flame test according to ASTM D6413-99.

Nonionic surfactants that may be utilized in the present invention include Sigma's Triton® X-series prepared by the reaction of octylphenol with ethylene oxide which produces alkylaryl polyether alcohols having the following general structural formula:

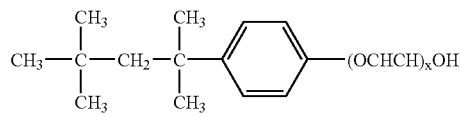

in which x indicates the average number of ethylene oxide units in the ether side chain, x can range from 1 up to about 70. The Triton® X-series is composed of several products having different lengths of the polyethylene chain. Examples of the Triton® X-series include X-100 (9 to 10 ethylene oxide units per molecule in the ether side chain, 1% solution cloud point, 65° C.) and Triton X-114 (7 to 8 ethylene oxide units in the ether side chain, 1% solution cloud point, 22° C.). The products of the Triton® X-series are mixtures with respect to the polyethylene chain; the number of ethylene oxide units in the ether side chain (e.g., 7 to 8 ethylene oxide units for Triton X-114) represents the average number of ethylene oxide units in the ether side chain (the distribution of polyethylene chain lengths follows the Poisson distribution).

By the term "wool," "wool fiber," "animal hair," and the like, is meant any commercially useful animal hair product, for example, wool from sheep, camel, rabbit, goat, llama, and known as merino wool, shetland wool, cashmere wool, alpaca wool, mohair, etc. The term "wool" includes the fiber from fleece of the sheep or lamb or hair of the Angora or Cashmere goat (and may include the so-called specialty fibers from the camel, alpaca, llama, and vicuna) which has never been reclaimed from any woven or felted wool product (Federal Trade Commission, Rules and Regulations Under the Textile Fiber Products Identification Act, effective Mar. 3, 1960 as amended Jul. 9, 1986, page 2.)

The methods of the invention can also be used with blends of wool with other natural and synthetic fibers, including but not limited to Cotton, Flax, Rayon, Acetate, Acrylic, Nylon, Olefin, Polyester, Spandex, Aramid, Lyocell, Olefin, Polypropylene, PEEK, PLA, Fluorocarbon, Carbon, Glass, PBI, and others known in the art.

The methods of the invention can be used with natural fibers, synthetic fibers, and mixtures thereof in the form of top, fiber, yarn, or woven or knitted fabric. The methods can also be carried out on loose fiber stock or on yarn, fabrics or garments made from natural fibers, synthetic fibers, and mixtures thereof. The methods can be performed at many different stages of processing, including either before or after dyeing.

It should be emphasized that wool and other animal hair materials are products of biological origin. The material may vary greatly, e.g., in chemical composition and morphological structure depending on the living conditions and health of the animal. Accordingly, the effect(s) obtained by subjecting wool or other animal hair products to the method of the present invention may vary in accordance with the properties of the starting material.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Example 1

Synthesis of Polyamic acid (precursor to PISi): The reaction setup was purged with inert gas before the monomers were added to the flask. All the glassware was washed and dried in an oven set at 200° C. The solvents were dried using molecular sieves. The following amounts of monomers were weighed for synthesis of copolymer: 10.000 grams (0.03103 moles) of BTDA; 1.335598 grams (0.0013355 moles) of PDMS; 3.211152 grams (0.029694 moles) of m-PDA. The amount of solvents used in the synthesis of polyamic acid was such that a 10% polyamic acid solution was obtained.

The setup for the reaction consisted of a 500 ml three neck round bottom flask. A magnetic stir bar was placed in the flask and the flask was placed in a magnetic stirrer. An addition funnel was attached to one of the necks of the flask. A drying tube was attached to the mouth of the funnel. Another addition funnel was attached to the second neck of the flask and a thermometer was attached to the third neck of the flask. Dry nitrogen gas was purged through the flask before the addition of any solvent or monomers.

The reaction was conducted as described in the following steps: (1) 10.0000 grams of BTDA were added to a 500 ml three neck round bottom flask with 40 ml of DMAC and 40 ml THF. (2) After the BTDA dissolved in the solvent, PDMS (polydimethylsiloxane) dissolved in 15 ml THF was added to the reaction bath through an addition funnel. The addition of PDMS to the reaction bath was done drop wise over a period of 10 minutes. (3) The addition funnel was then rinsed with 5 ml of THF. The reaction mixture was stirred for 30 minutes. (4) m-PDA dissolved in 10 ml of DMAC and 10 ml of THF was added drop wise to the reaction bath followed by the 10 ml of DMAC solution used to rinse the funnel. The reaction mixture turned into a clear viscous solution. (5) The reaction was allowed to proceed for eight hours.

Solution Imidization of Polyamic acid: The setup consisted of a three neck round bottom flask. A magnetic stir bar was inserted in the flask and the flask was placed in a heating mantle. A Dean Stark apparatus was fitted to one neck of the three neck flask. An addition funnel was attached to the second neck of the flask and a thermometer was attached to the third neck using a thermometer adapter.

Solution imidization was conducted as described in the following steps: (1) A solvent/cosolvent mixture of DMAC and CHP was added to the three-neck flask. The solvent/cosolvent mixture was then heated to a temperature of 150° C. (2) The polyamic acid solution was slowly added to the flask. Precaution was taken not to let the temperature drop below 150° C. (3) THF present in the polyamic acid solution being a very low boiling solvent boiled off immediately and was collected in a Dean Stark apparatus. (4) The remaining solution was refluxed for 24 hours to obtain a polyimidesiloxane copolymer PISi-1.

PISi-2 was synthesized in a similar manner as PISi-1 described above. The monomers used in this synthesis were BTDA, 3,5 diaminobenzoic acid (DABA), and aminopropyl terminated polydimethylsiloxane (PDMS).

Characterization of the polymer: FT-IR was used to characterize the polyamic acid and the polyimidesiloxane formed in the reaction. IR bands evident in the first product, polyamic acid (carboxyl groups at 1630-1720 $cm^{-1}$) were absent from the polyimide, C=O absorbance at 1790. Polyimide ring absorbance was diagnostic at 730 $cm^{-1}$. Silicone stretch for Si—$CH_3$ appeared at 1250 $cm^{-1}$.

Application of PISi copolymers to wool: In some cases, the application of PISi-1 copolymer involved the formation of a stable emulsion since PISi-1 copolymer synthesized from BTDA, m-PDA and PDMS precipitated in the reaction solution and the precipitate was insoluble in NMP or THF. Two emulsions were made using the methods described below:

Method 1: Precipitated PISi-1 copolymer was separated from the reaction solution by centrifugation followed by drying in a SPEX 6700 Freezer mill. 5 mg of PISi-1 copolymer powder was mixed with 10 ml of Triton X-114 and 90 ml of water in a Waring blender for 10 minutes to form an emulsion. The emulsion was centrifuged for 20 minutes to test its stability for longer periods.

Method 2: PISi-1 slurry (precipitated along with some unimidized polyamic acid solution) was mixed with 5 ml of Triton X-114 and 40 ml of water in a Waring Blender for 10 minutes. The mixture was left overnight without disturbing to test its stability.

The stability of PISi-1 emulsion formed using dried PISi-1 copolymer powder was not as good as that of the PISi-1 emulsion formed from slurry. Hence, PISi slurry was used to make emulsions for applying the PISi-1 copolymer to wool.

Application of PISi emulsions to wool fabrics by exhaustion: PISi-1 emulsion was applied to wool jersey fabric by heating the solution containing the polymer emulsion to boil with the fabric. The treatment was conducted for 30 minutes after which the sample was removed from the beaker, squeezed, and dried at 120° C. for 15 minutes followed by drying of samples in a vacuum oven for 30 minutes.

Application of PISi-2 copolymer: PISi-2 copolymer was insoluble in water under alkaline conditions. Hence, sodium hydroxide and ethylene diamine were used to prepare two solutions containing 5 and 10 percent of PISi-2 copolymer.

Treatment of wool jersey fabric with PIS and metal salt additives used as flame retardants by padding and exhaustion:

A. Treatment of untreated wool with PISi-2 and metal salt additives by padding. The following recipe was used to prepare the pad liquor: 10 grams per liter (gpl) of PISi-2; 5 mL of ethylene diamine; 3 gpl of Triton X-114; 5 gpl of additive. The PISi-2 copolymer was mixed with 5 ml of ethylene diamine and 5 ml of water was added to the mixture. The copolymer was found to be soluble in water when present along with ethylene diamine. Metal salts additives were added to the copolymer solution and mixed thoroughly. The total volume of the pad liquor was made to 250 mL by adding deionized water. Five pad liquors were prepared with different additives in the pad liquor. The additives used in this experiment were zinc hexaborate, antimony oxide, sodium tetraborate, magnesium hydroxide, and aluminum trihydrate. Wool fabric samples were soaked in the pad liquors for 30 minutes and padded by two dip-two nip process at 1 bar pressure applied across the pad rollers of the padding mangle. After padding, the samples were dried at 100° C. in an oven for 5 minutes and stored under standard conditions of 65±2% R.H. and 21±1° C.

B. Treatment of untreated wool with PISi-2 and metal salt additives by exhaustion. The following recipe was used to prepare solutions for application to wool fabric by exhaustion: 10% owf of PISi-2; 10% owf of ethylene diamine; 1% owf of Triton X-114; 5% owf of additive. 10% on weight of fabric of ethylene diamine was added to 10% on weight of fabric of PISi-2 copolymer. The copolymer and ethylene diamine were mixed thoroughly and 5 ml of water was added. The polymer became readily soluble in water when present along with ethylene diamine. Water was added to the treatment solution so that the material to liquor ratio was 1:10. Zinc hexaborate and magnesium hydroxide were solubilized in water by adding sulfuric acid and mixed with required amount of copolymer solution. Since sodium tetraborate was soluble in water, it was directly added to the copolymer solution. An additional solution of PISi-2 copolymer was prepared without any additive. Wool fabric samples were then treated with the copolymer solutions in the Atlas LP2 Launder-O-meter machine for 60 minutes at 50° C. After 60 minutes, the fabric were removed and squeezed using a padding mangle with no pressure applied across the pad rollers of the padding mangle. The squeezed samples were dried at 100° C. in an oven for 5 minutes and then stored under standard conditions of 65±2% R.H. and 21±1° C.

Evaluation of flammability of treated wool: The burning behavior of fabrics used in the manufacture of protective clothing was tested according to ASTM 6413-99 vertical flame test method.

Figure 3:
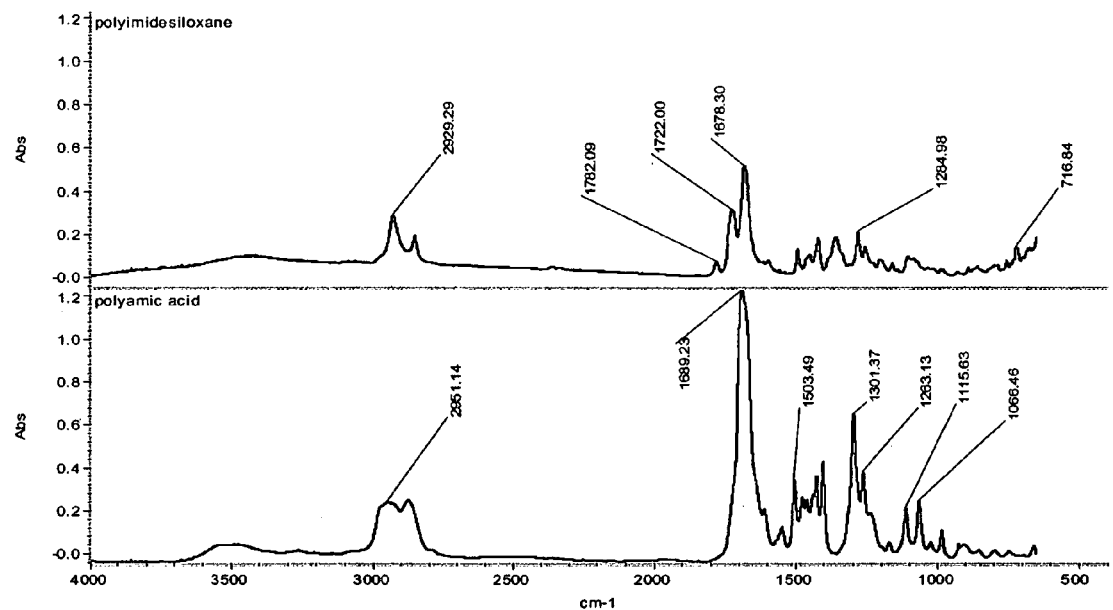
FIG. 3 shows FT-IR Spectra for PISi-1 copolymer and its precursor—polyamic acid.

Results. Characterization of PISi-1 and PISi-2:

FT-IR Spectra for PISi-1 copolymer and its precursor—polyamic acid are shown in FIG. 3. Note appearance of peak at 1782, 1722 and 716 $cm^{-1}$ identifying the conversion of polyamic acid precursor to PISi copolymer.

Burning behavior of (1) wool, (2) 40% wool/48% Nomex, 1% Kevlar/1% conducting fiber fabric, and (3) BASOFIL™ (a blend of melamine and Aramid (Nor-Fab series 2700 Omni 45™ outershell fabric blend of 40% BASOFIL™ and 60% Para-Aramid)) fabrics: Burning behavior of PISi copolymer treated wool fabrics was compared to the burning of 40% wool/48% Nomex, 1% Kevlar/1% conducting fiber fabric blends and nomex fabric blended with melamine. Results of vertical flame test conducted according to the ASTM 6413-99 Vertical Flame Test method using 40% wool/48% Nomex, 1% Kevlar/1% conducting fiber fabric and BASOFIL™ (a blend of melamine and Aramid (Nor-Fab series 2700 Omni 45™ outershell fabric blend of 40% BASOFIL™ and 60% Para-Aramid)) fabrics are shown in the tables below.

Figure 4:
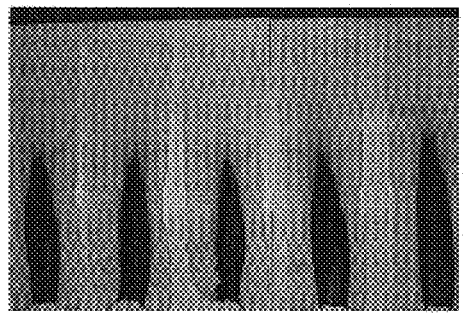
FIG. 4 shows burning of 40% wool/48% Nomex, 1% Kevlar/1% conducting fiber fabric (top photo), BASOFIL™ (a blend of melamine and Aramid (Nor-Fab series 2700 Omni 45™ outershell fabric blend of 40% BASOFIL™ and 60% Para-Aramid)) (middle photo), and wool jersey Without any FR (flame resistance) treatment (bottom) tested according to the ASTM 6413-99 Vertical flame test method respectively.
Figure 4:
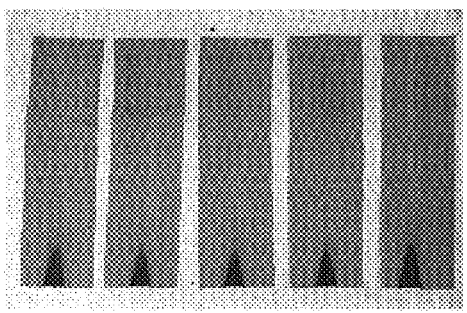
Figure 4:
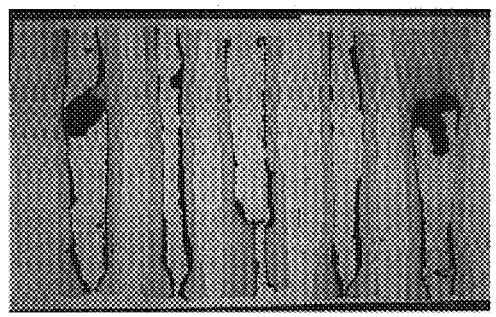

FIG. 4 illustrates burning of 40% wool/48% Nomex, 1% Kevlar/1% conducting fiber fabric (top photo), BASOFIL™ fabric (middle photo), and wool jersey fabric without any FR treatment tested according to the ASTM 6413-99 Vertical flame test method respectively. Wool jersey fabric samples without any flameproof treatment burned completely on exposure to a flame and the residue was a soft ash that dissipated readily. Wool/Nomex fabrics burned initially with undesirable melt/drip behavior and formed a hard intractable mass residue yet did not support combustion. BASOFIL™ fabric when burned generated large amounts of smoke and the residue was a hard crusted mass with the char remaining in the fabric structure. Also, an undesirable afterglow was observed in the case of BASOFIL™.

Figure 5:
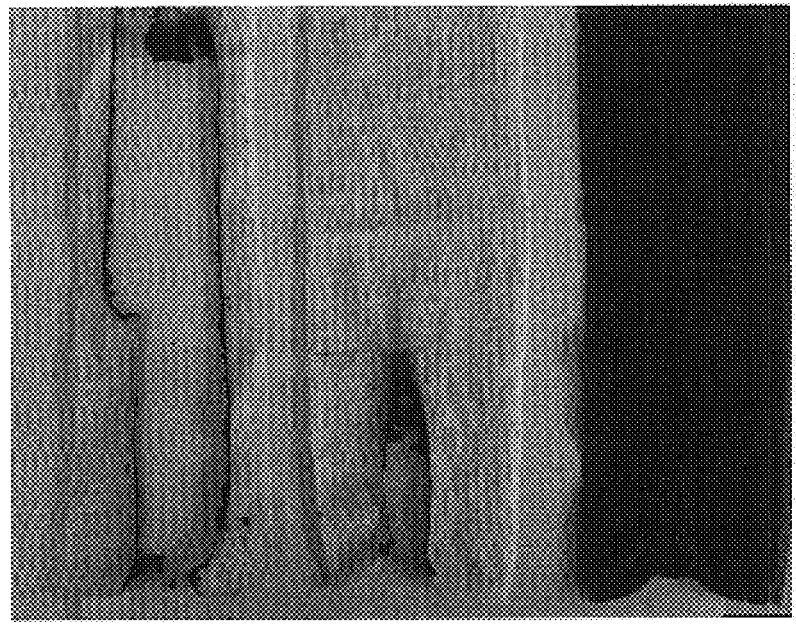
FIG. 5 shows burning of wool jersey fabric treated with PISi-1 copolymer by exhaustion (middle fabric) compared with untreated wool (left) and 40% wool/48% Nomex, 1% Kevlar/1% conducting fiber fabric (right) tested according to the ASTM 6413-99 Vertical flame test method respectively.

By comparison, wool jersey fabric treated with PISi-1 copolymer by exhaustion (middle fabric) was compared with untreated wool (left) and 40% wool/48% Nomex, 1% Kevlar/1% conducting fiber fabric (right) as shown in FIG. 5.

In the tables below, After Flame time indicates the time in seconds that the sample keeps burning after the flame was removed. After glow time indicates the time in seconds for which there was an after glow observed (after glow was something like a smoldering cigarette or smoldering fabric). Char length is the length of sample that was burnt during the test measured after the test was conducted. (ESB indicates entire sample burnt). The fourth column is the comments column which indicates whether there was any melting or dripping observed during the test conducted on the sample.

Application of PISi-2 copolymer solubilized by sodium hydroxide and applied to wool (5 and 10 percent concentrations) where high value for after flame was not good and low char lengths were best.

| Sample | | After Flame time (s) | After glow time (s) | Char length (cm) | Occurrence of melting or dripping |
|---|---|---|---|---|---|
| ARS fabric 10% owf PISi-2 E | 1 | 28 | None (—) | None (—) | None (—) |
| | 2 | 23 | — | — | — |
| | 3 | 24 | — | — | — |
| ARS fabric 5% owf PISi-2 5E | 1 | 28 | — | — | — |
| | 2 | 43 | — | — | — |
| | 3 | 27 | — | — | — |
| Wool as received 10% owf PISi-2 W | 1 | 0 | — | 9.0 | — |
| | 2 | 0 | — | 10.0 | — |
| | 3 | 32 | — | — | — |
| Wool as Received 5% owf 5W | 1 | 29 | — | — | — |
| | 2 | 2 | — | 12.0 | — |
| | 3 | 3 | — | 10.3 | — |

ARS wool fabric prepared by the method described in U.S. Patent Application 10/730,208 filed 8 Dec. 2003.
Wool as received was untreated wool jersey, TF 532 (40% wool/48% Nomex/1% Kevlar/1% conducting fiber).

Application of PISi-2 copolymer solubilized by ethylene diamine and applied to wool (5 and 10 percent concentrations.

| Sample | | After Flame time (s) | After glow time (s) | Char length (cm) | Occurrence of melting or dripping |
|---|---|---|---|---|---|
| E' | 1 | 0 | None (—) | 8.5 | None (—) |
| | 2 | 0 | — | 12.0 | — |
| | 3 | 0 | — | 8.5 | — |
| 5E' | 1 | 26 | — | — | — |
| | 2 | 0 | — | 10.7 | — |
| | 3 | 29 | — | — | — |
| W' | 1 | 37 | — | 26.5 | — |
| | 2 | 0 | — | 12.2 | — |
| | 3 | 18 | — | 22.6 | — |

-continued

Application of PISi-2 copolymer solubilized by ethylene diamine and applied to wool (5 and 10 percent concentrations.

| Sample | | After Flame time (s) | After glow time (s) | Char length (cm) | Occurrence of melting or dripping |
|---|---|---|---|---|---|
| 5W' | 1 | 53 | — | — | — |
| | 2 | 67 | — | — | — |
| | 3 | 25 | — | — | — |

Treatment of untreated wool (as received; no enzyme treatment) with PISi-2 and metal salt additives by padding.

| Sample | | After flame time (seconds) | After glow time (seconds) | Char length (cm) | Melting, Dripping, etc. |
|---|---|---|---|---|---|
| PISi-2 | 1 | 29 | * | ** | |
| Bath 1 | 2 | 31 | * | ** | |
| (Zinc hexaborate) Fabric 1 | 3 | 27 | * | ** | |
| PISi-2 | 1 | 28 | * | ** | |
| Bath 1 | 2 | 33 | * | ** | |
| Fabric 2 | 3 | 26 | * | ** | |
| PISi-2 | 1 | 16 | * | ** | |
| Bath 2 | 2 | 1 | * | ** | |
| (Antimony oxide) Sample 1 | 3 | 41 | * | ** | |
| PISi-2 | 1 | 43 | * | ** | |
| Bath 2 | 2 | 30 | * | ** | |
| Sample 2 | 3 | 22 | * | ** | |
| PISi-2 | 1 | 26 | * | ** | |
| Bath 3 | 2 | 26 | * | ** | |
| (Sodium tetraborate) Sample 1 | 3 | 41 | * | ** | |
| PISi-2 | 1 | 30 | * | ** | |
| Bath 3 | 2 | 26 | * | ** | |
| Sample 2 | 3 | 29 | * | ** | |
| PISi-2 | 1 | 33 | * | ** | |
| Bath 4 | 2 | 45 | * | ** | |
| (magnesium hydroxide) Sample 1 | 3 | 35 | * | ** | |
| PISi-2 | 1 | 46 | * | ** | |
| Bath 4 | 2 | 28 | * | ** | |
| Sample 2 | 3 | | * | ** | |
| PISi-2 | 1 | 0 | * | | |
| Bath 5 | 2 | 0 | * | | |
| (Aluminum trihydrate) Sample 1 | 3 | 43 | * | ** | |
| PISi-2 | 1 | 43 | * | ** | |
| Bath 5 | 2 | 34 | * | ** | |
| Sample 2 | 3 | 25 | * | ** | |
| PISi-2 | 1 | 53 | * | ** | |
| Bath 6 | 2 | 21 | * | ** | |
| (no additives) Sample 1 | 3 | 20 | * | ** | |
| PISi-2 | 1 | 58 | * | ** | |
| Bath 6 | 2 | 47 | * | ** | |
| Sample 2 | 3 | 23 | * | ** | |

* indicates no after glow was observed.
** indicates that the entire sample was burnt Treatment of untreated wool with PISi-2 and metal salt additives by exhaustion in LP2 Launder-O-Meter.

| Sample | | After flame time (seconds) | After glow time (seconds) | Char length (cm) | Melting, Dripping, etc. |
|---|---|---|---|---|---|
| PISi-2 | 1 | 50 | No | — | No |
| Sample 1 | 2 | 0 | No | 12.7 | No |
| With No additives | 3 | 0 | No | 6.0 | No |
| PISi-2 | 1 | 0 | No | 9.5 | No |
| Sample 2 | 2 | 56 | No | — | No |
| No additives | 3 | 0 | No | 8.0 | No |
| PISi-2 | 1 | 32 | No | — | No |
| Sample 3 | 2 | 28 | No | — | No |
| With Zinc hexaborate | 3 | 8 | No | 17.3 | No |
| PISi-2 | 1 | 28 | No | — | No |
| Sample 4 | 2 | 0 | No | 9.5 | No |
| With Zinc hexaborate | 3 | 0 | No | 8.0 | No |
| PISi-2 | 1 | 26 | No | — | No |
| Sample 5 | 2 | 32 | No | — | No |
| With Sodium tetraborate | 3 | 34 | No | — | No |
| PISi-2 | 1 | 28 | No | — | No |
| Sample 6 | 2 | 27 | No | — | No |
| Sodium Tetraborate | 3 | 32 | No | — | No |
| PISi-2 | 1 | 23 | No | — | No |
| Sample 7 | 2 | 22 | No | — | No |
| With Magnesium hydroxide | 3 | 25 | No | — | No |
| PISi-2 | 1 | 26 | No | — | No |
| Sample 8 | 2 | 27 | No | — | No |
| With Magnesium hydroxide | 3 | 28 | No | — | No |

Figure 6:
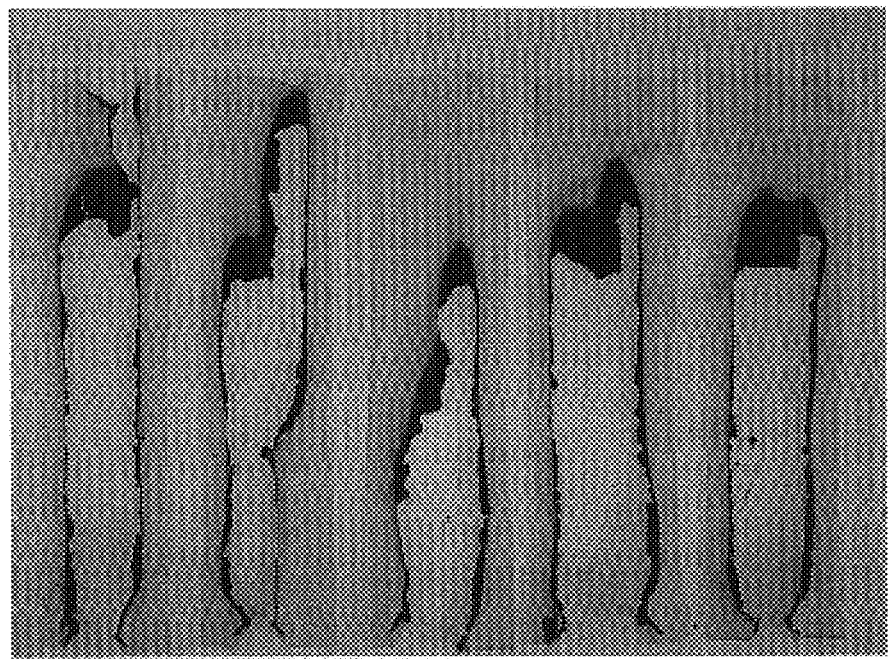
FIG. 6 shows burning of untreated wool (no treatment with enzyme, no FR treatment) tested according to the ASTM 6413-99 Vertical flame test method.

FIG. 6 is a photo of the following test (no treatment with enzyme, no FR treatment):

| Sample | | After Flame time (sec) | After glow (sec) | Char Length (cm) | Melting/ Dripping |
|---|---|---|---|---|---|
| Test Fabrics | 1 | 52.4 − 12 = 40.4 | No | ESB | No |
| Untreated Wool | 2 | 45.0 − 12 = 33.0 | No | 29.8 | No |
| (Style # 532) | 3 | 35.1 − 12 = 23.1 | No | 21.4 | No |
| | 4 | 33.4 − 12 = 21.4 | No | 25.0 | No |
| | 5 | 34.5 − 12 = 22.5 | No | 24.0 | No |

Average Char length = 25.05
Std Deviation = 3.51141

Figure 7:
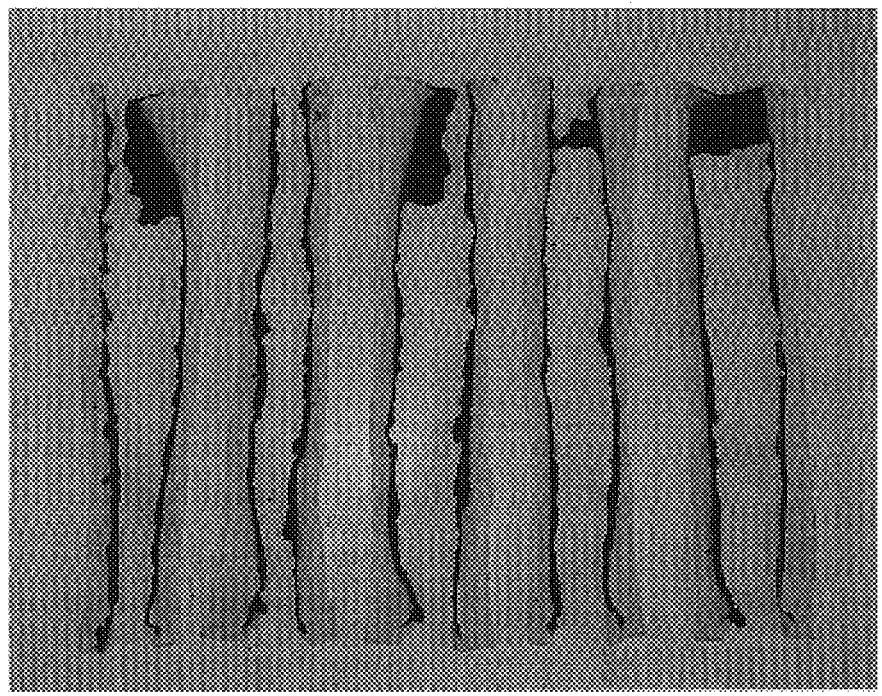
FIG. 7 shows burning of ARS Treated Wool (ESPERASE 8.0L™ with no FR treatment, Style # 532) tested according to the ASTM 6413-99 Vertical flame test method.

FIG. 7 is a photo of the following test:

| Sample | | After Flame time (sec) | After glow (sec) | Char Length (cm) | Melting/ Dripping |
|---|---|---|---|---|---|
| Test Fabrics | 1 | 40.4 − 12 = 28.4 | No | ESB | No |
| ARS Treated Wool | 2 | 16.4 − 12 = 4.4 | No | ESB | No |
| ESPERASE | 3 | 43.8 − 12 = 31.8 | No | ESB | No |

-continued

| Sample | | After Flame time (sec) | After glow (sec) | Char Length (cm) | Melting/Dripping |
|---|---|---|---|---|---|
| 8.0L ™ (Style # 532) no PISi applied | 4 5 | 43.8 − 12 = 31.8 38.8 − 12 = 26.8 | No No | ESB ESB | No No |

Average Char length = 0

Figure 8:
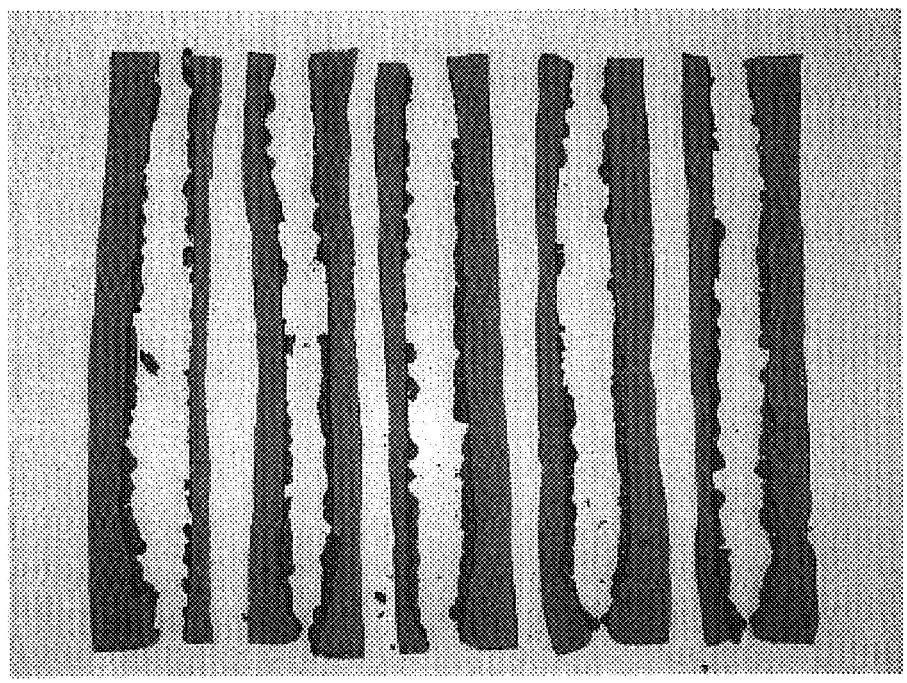
FIG. 8 shows burning of Sextet Fabrics ARS Treated Wool (ESPERASE 8.0™ with no FR treatment) tested according to the ASTM 6413-99 Vertical flame test method.

FIG. 8 is a photo of the following test:

| Sample | | After Flame time (sec) | After glow (sec) | Char Length (cm) | Melting/Dripping |
|---|---|---|---|---|---|
| Sextet Fabrics ARS Treated Wool ESPERASE 8.0L ™ (Style # 9743) no PISi-2 applied | 1 2 3 4 5 | 32.4 − 12 = 20.4 32.6 − 12 = 20.6 34.8 − 12 = 22.8 32.8 − 12 = 20.8 33.0 − 12 = 21.0 | No No No No No | ESB ESB ESB ESB ESB | No No No No No |

Average Char length = 0

Figure 9:
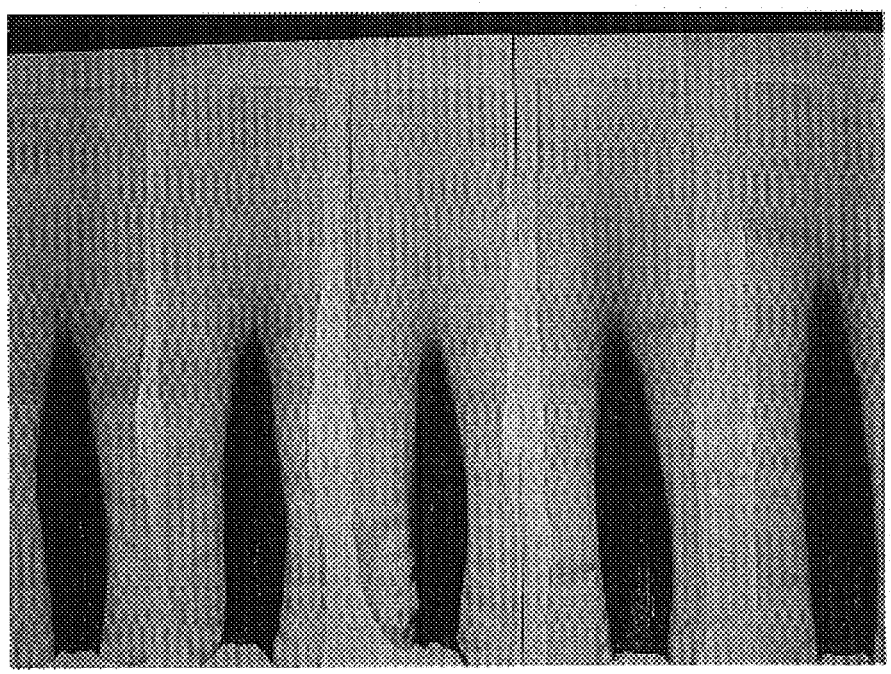
FIG. 9 shows burning of 40% wool/48% Nomex, 1% Kevlar/1% conducting fiber fabric tested according to the ASTM 6413-99 Vertical flame test method.

FIG. 9 is a photo of the following test:

| Sample | | After Flame time (sec) | After glow (sec) | Char Length (cm) | Melting/Dripping |
|---|---|---|---|---|---|
| 40% wool/48% Nomex, 1% Kevlar/1% conducting fiber fabric | 1 2 3 4 5 | 0.0 0.0 0.0 0.0 0.0 | No No No No No | 10.0 8.9 10.0 8.7 11.4 | No No No No No |

Average Char length = 9.8
Std deviation = 1.079352

Figure 10:
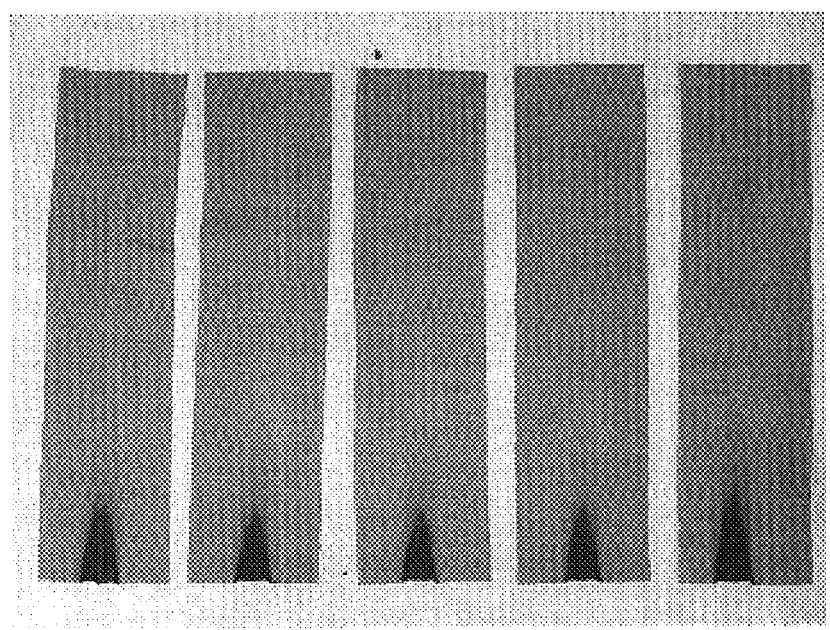
FIG. 10 shows burning of BASOFIL™ (a blend of melamine and Aramid (Nor-Fab series 2700 Omni 45™ outershell fabric blend of 40% BASOFIL™ and 60% Para-Aramid)) tested according to the ASTM 6413-99 Vertical flame test method.

FIG. 10 is a photo of the following test:

| Sample | | After Flame time (sec) | After glow (sec) | Char Length (cm) | Melting/Dripping |
|---|---|---|---|---|---|
| BASOFIL ™ (a blend of melamine and Aramid (Nor-Fab series 2700 Omni 45 ™ outershell fabric blend of 40% BASOFIL ™ and 60% Para-Aramid)) | 1 2 3 4 5 | 0.0 0.0 0.0 0.0 0.0 | 5.0 7.0 7.0 7.0 6.0 | 0.5 0.3 0.3 0.2 0.5 | Smoke is generated |

Average Char length = 0.36
Std Deviation = 0.13416079

Example 2

We have previously reported on the ARS process for machine-washable wool that controls felting shrinkage to less than 3% after pretreatment with an activated alkaline hydrogen peroxide system using dicyandiamide with gluconic acid stabilizer as a pre-step when applied at 30° C. for 35 minutes (U.S. Provisional Application No. 60/483,991 filed 30 Jun. 2003; U.S. Provisional Application No. 60/495,395 filed 15 Aug. 2003; U.S. patent application Ser. No. 10/730,208 filed 8 Dec. 2003; U.S. Patent Application publication 2004/0261192 A1). Subsequently ESPERASE™ (serine protease) 8.0 L was employed at 45° C. (113° F.) for 40 minutes, pH 8-9, with a reducing agent, $Na_2SO_3$. According to the ARS process, pretreatment of wool with 3 g/L NaOH, 1 g/L potassium gluconate, 3 g/L dicyandiamide (DD), 2 g/L Triton X-114, 12 mL/L 50% hydrogen peroxide at pH 11.5, liquor ratio (LR) 10:1, applied at 30° C. for 30 minutes conferred whiteness and anionic character to wool for enzymatic digestion of the scales of wool in a subsequent treatment step from a fresh bath containing 1.5% on weight of fiber (owf) ESPERASE™ 8.0 L, a bacterial subtilisin serine protease, 548 TU/mg activity, (Novozymes North America, Inc. Franklinton, N.C.), $Na_2SO_3$ and triethanolamine buffer, pH 8-9, applied at 45° C. for 40 minutes. Alternatively, cysteine (thiol) protease, crude papain from Papaya Latex (Sigma) and commercial papain, 200 TU/mg activity LIQUIPANOL T-200™ (papain)(Enzyme Development Corporation, NY) were applied individually at 50° C. for 60 minutes after the pretreatment step. LIQUIPANOL T-200™ was applied at 6.5% by weight of fabric and liquor ratio 10:1.

We compared the burning behaviors of the following: (1) Untreated wool jersey, TF 532 (40% wool/48% Nomex/1% Kevlar/1% conducting fiber; no ARS treatment for FR, just did the flame test to use these results as a standard for what PISi treatment should achieve). (2) ARS-LIQUIPANOL™-treated TF532 wool jersey fabric, 6.5% on weight of fabric (owf), treated for flame resistance (FR) with PISi-1 precursor polymer, polyamic acid (PAA), citric acid, urea, and alum additives. Applied 6.5% owf Liquipanol T-200 papain to the TF532 in the LP2 Launder-O-Meter, 50° C. for 60 minutes after the pretreatment step, rinse, air-dry. We utilized the same step 1 of the ARS bleaching step (pretreatment) using dicyandiamide, alkaline hydrogen peroxide, gluconic acid, etc as reported in U.S. Provisional Application No. 60/483,991 filed 30 Jun. 2003; U.S. Provisional Application No. 60/495,395 filed 15 Aug. 2003; U.S. patent application Ser. No. 10/730,208 filed 8 Dec. 2003. In step 2 we substituted papain LIQUIPANOL T-200™ for ESPERASE™. Applied PAA by exhaust (5% on the weight of the fabric) in beakers in the LP2 for 30 to 60 minutes at 100° C., then rinsed and air-dried. All PAA polymers were cryo-ground, ball-milled, and sieved before using them to paste up with the additives in about 50 mL water and then this volume was brought to bath volume of 400 mL to treat 40 grams fabric for a Liquor Ratio (LR) 10. Triton X was added to the baths. (3) ARS-LIQUIPANOL™-treated TF532 wool jersey fabric treated for flame resistance (FR) with PISi-1 with the bath additives: citric acid, potassium aluminum sulfate (alum), and urea. Applied 6.5% owf Liquipanol T-200 papain to the TF532 in the LP2 Launder-O-Meter, 50° C. for 60 minutes after the pretreatment step, rinse, air-dry. We utilized the same step 1 of the ARS bleaching step (pretreatment) using dicyandiamide, alkaline hydrogen peroxide, gluconic acid, etc as reported in U.S. Provisional Application No. 60/483,991 filed 30 Jun. 2003; U.S. Provisional Application No. 60/495,395 filed 15 Aug. 2003; U.S. patent application Ser. No. 10/730,208 filed 8 Dec. 2003. In step 2 we substituted papain LIQUIPANOL T-200™ for ESPERASE™. Applied PISi-1 by exhaust (5% on the weight of the fabric) in beakers in the LP2 for 30 to 60 minutes at 100° C., then rinsed and air-dried. All PISi-1 polymers were cryo-ground, ball-milled, and sieved before using them to paste up with the additives in about 50 mL water and then this volume was brought to bath volume of 400 mL to treat 40 grams fabric for a Liquor Ratio (LR) 10. Triton X was added to the baths. (4) Wool jersey (Style 9743 fine gauge 1×1 Rib-medium/fine yarn) made by Sextet Fabrics, Inc., ARS-treated in the Paterson Mill in NJ with 3% owf ESPERASE™, then dyed to "military green" and samples sent to ERRC's wool lab for polyamic acid (PAA) treatment (applied by exhaust and by padding, then air-dried) with citric acid, potassium aluminum sulfate (alum), and urea to improve FR. (5) Wool jersey (Style 9743 fine gauge 1×1 Rib-medium/fine yarn) made by Sextet Fabrics, Inc., ARS-treated in the Paterson Mill in NJ with 3% owf ESPERASE™, then dyed to "military green" and samples sent to ERRC's wool lab for polyimidisiloxaneamic (PISi-1) treatment (applied by exhaust and by padding, then air-dried) with citric acid, potassium aluminum sulfate (alum), and urea to improve FR.

Citric acid, urea, and alum were added to the PISi-1 treatment baths to create better adhesion to the wool fabric substrate. The synthesized PISi-1 was ball-milled in a cryo-grinder to a fine powder and the powder was sieved through 80 mesh for a particle size of 0.177 mm (177 microns) to allow for complete dispersion in the bath solution. In Example 1 above, bath applications were made by exhaust in individual lab beakers; in Example 2, PISi-1 applications were made in individual tumbling canisters of the LP2 Launder-O-Meter (Atlas) at 100° C. for 60 minutes, LR 20:1. PISi-1 powder with the three additives and Triton X-100 was pasted up first in a small volume of water before the treatment baths were brought to volume. Fabric samples, 17.0"×24.0", 44-45 g per bath were placed in individual 800 mL capacity canister baths of the LP2.

As noted above, polyimidisiloxanes can be synthesized via different routes. The classical method is the two-step method in which a polyamic acid is formed by the reaction between the difunctional amine and the difunctional anhydride and an amino alkyl terminated polydimethyl siloxane. In the second step, the polyamic acid when heated in a solvent-cosolvent mixture loses water to form the imide ring in the final product, a polyimidesiloxane copolymer.

PISi-1 polymer synthesis involved condensation polymerization of the following:

1. Benzophenone 3,3', 4,4'-tetracarboxylic dianhydride (BTDA), vacuum oven-dried, soluble in 1-Methyl-2-pyrrolidinone anhydrous, 99.5%, (NMP) and (THF)

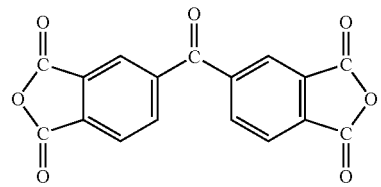

2. Aminopropyl-terminatedpolydimethylsiloxane (PDMS), a colorless liquid, miscible in THF and immiscible in NMP

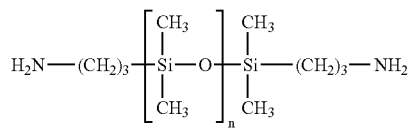

3. meta-Phenylenediamine (m-PDA) dissolved in NMP solvent

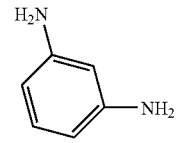

(under dry nitrogen in solvent system of NMP and THF at 30° C. for 12 hours to the formation of polyamic acid (PAA) precursor to PISi-1 formation which in a subsequent step at 165° C. in NMP and CHP imidized PAA to form PISi-1.

Procedure: Synthesis of Polyamic acid (PAA) from BTDA, mPDA and PDMS. The following amounts of monomers were used in the synthesis of PAA: 0.0230 moles of m-phenylene diamine (m-PDA) (2.48722 grams), 0.0229 moles Benzophenone 3,3', 4,4'-tetracarboxylic anhydride (BTDA) (7.404845 grams), 0.0009 moles amino propyl terminated polydimethyl siloxane (PDMS) (0.956765 grams). The amount of solvents used in the synthesis of polyamic acid was such that a 5% polyamic acid solution was obtained.

All glassware used in the synthesis was washed and dried in an oven set at 200° C. for at least 8 hours. Anhydrous solvents were dispensed from the bottles fitted with sure seal caps with a syringe. The reaction setup was purged with dry nitrogen gas before adding any monomers to the flask. The setup for the reaction consisted of a 500 ml three neck round bottom flask with a magnetic stirrer placed inside to stir the contents of the flask. An addition funnel was fitted to one of the necks of the flask, a drying tube to another, and a thermometer to the third neck of the flask.

BTDA dissolved in 40 ml of NMP and 40 ml of THF was added to the flask. The solution was stirred to ensure complete dissolution of BTDA in the solvent system. PDMS dissolved in 15 ml of THF and 5 ml of NMP was added drop wise to the BTDA solution via the addition funnel over a period of 15 minutes. After complete addition of PDMS, the addition funnel was washed with 5 ml of THF and the reaction mixture was stirred for at least 30 minutes to ensure complete reaction of monomers. mPDA was dissolved in 10 ml of NMP and THF each and added drop wise to the reaction mixture using the addition funnel. The addition funnel was then washed with 10 ml of NMP and added to the reaction mixture. The reaction mixture was stirred for at least 8 hours when the solution becomes viscous.

Synthesis of PISi-1 from Polyamic acid (synthesized from BTDA, mPDA and PDMS): In the second step, the polyamic acid was imidized by solution imidization using NMP and n-cyclohexyl pyrrolidone (CHP) as azeotroping solvent used to remove water generated during imidization. The setup consisted of a three neck round bottom flask with a magnetic stir bar for stirring the reaction mixture. The contents of the flask were stirred and heated in this setup. A Dean Stark apparatus was fitted to one of the three necks of the flask. An addition funnel was fitted to the second neck and a thermometer fitted to the third neck using a thermometer adapter. Solution imidization was conducted as follows: A solvent/cosolvent mixture(80:20) of NMP (173.57 ml) and CHP (43.39 ml) was added to the three-neck flask. NMP present in the polyamic acid solution was also accounted for and 133.57 ml of NMP was added to the flask. The solvent/cosolvent mixture was then heated to a temperature of 165° C. The polyamic acid solution was added drop wise from the addition funnel to the flask. Precaution was taken not to let the temperature drop below 165° C. Since THF present in the polyamic acid solution was a low boiling solvent, it boiled off immediately and got collected in the Dean Stark apparatus that was later drained. The arm of the Dean Stark apparatus was then filled with CHP and the solution was refluxed for 24 hours to obtain a polyimide siloxane copolymer. The solution was refluxed for 24 hours even though the PISi-1 may precipitate within one hour of reaction.

The overall reaction is shown below:

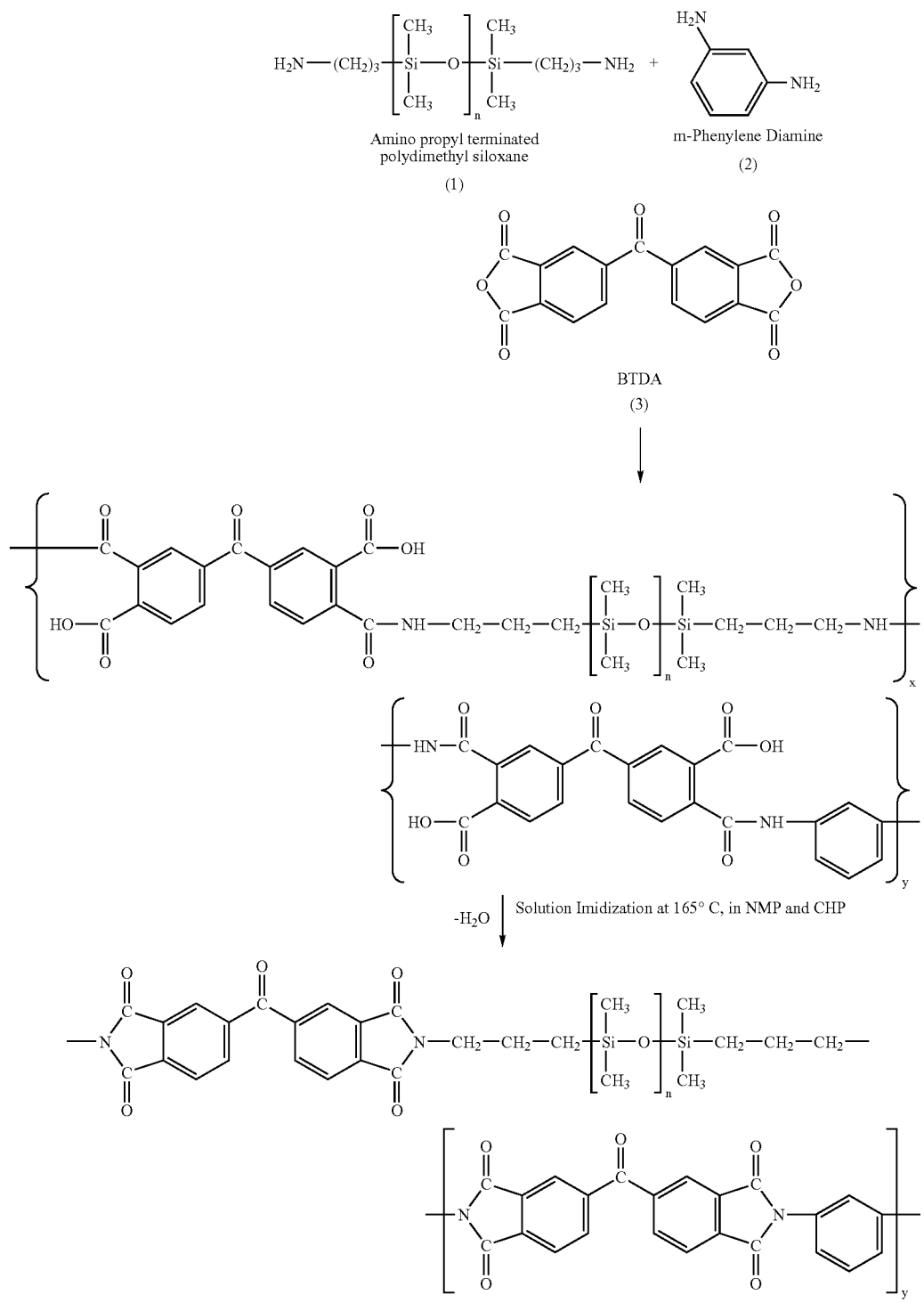

Application of PAA or PISi-1 polymer to wool fabrics involved the following:

Removal of NMP and CHP from the precipitate: Methanol was stirred in a high-speed blender and polyamic acid solution was added dropwise to isolate PAA from NMP and THF solvent mixture. The precipitated polymer was separated from the solvent mixture by vacuum filtration and air-dried. In case of PISi-1, PISi-1 (precipitated in solution imidization reaction) was separated from NMP and CHP solvents by centrifugation and washed with methanol. The precipitate was then air-dried.

Ball milling of polymer precipitate: A Spex 6700 Freezer Mill was used to grind PAA or PISi-1 polymer to a fine powder. The mill was cooled with liquid nitrogen. The precipitate was added to a sample vial along with an impactor and capped. The vial was placed in the mill and the impact frequency was set to the maximum. The polymer was subjected to two cycles of milling, each cycle lasting for 6 minutes. After milling, the vial was allowed to warm to room temperature. The polymer sample was removed from the vial and sieved using standard sieves to obtain a powder with particles that passed through a sieve of mesh size 80.

Preparation of solution for application to wool fabrics: A solution for application to wool fabrics was made using the following ingredients: 5 grams of urea per liter, 5 grams of citric acid per liter, 5 grams of alum per liter, 5 grams of PAA or PISi-1 per liter, 0.1% Triton X 405 (wetting agent) based on solution. The ingredients were mixed with a small amount of water in a beaker to form a paste. The paste was then mixed with required amount of water (300 ml) to form the treatment bath. The pH of the solution was in the range of 2 to 5. Fabric samples were introduced into the baths and the baths were heated to boil (100° C.). Treatment was conducted for 30 minutes in an Atlas Dyeing Machine LP2. After treatment, the samples were removed from the solution, squeezed to remove excess solution and dried in a bench top oven set at 120° C. for 10 minutes. The samples were left overnight to ensure complete drying of fabric sample. The flammability of the treated samples was evaluated according to ASTM D6413-99 Vertical Flammability Test Method.

Figure 11:
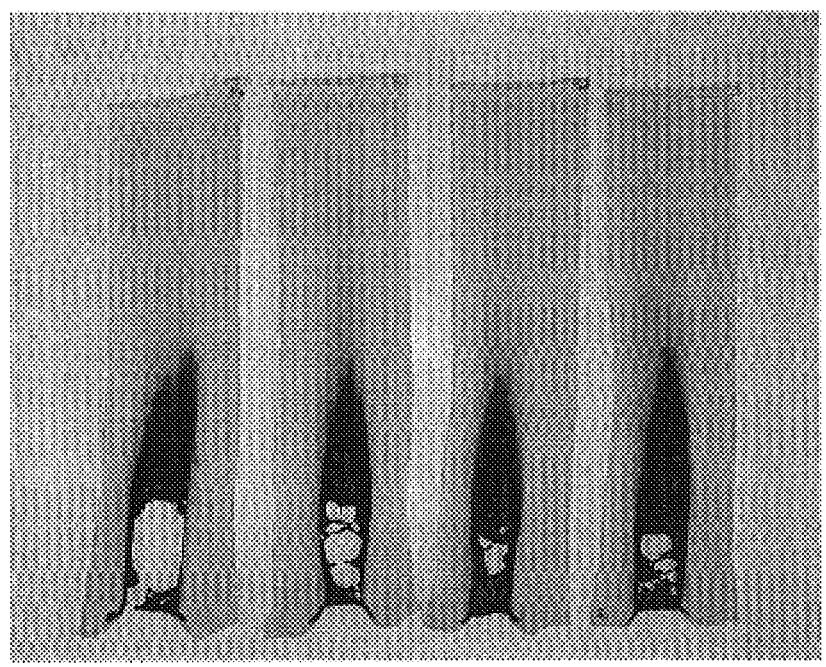
FIG. 11 shows burning of wool (no enzyme treatment) treated with PISi-1, urea, citric acid and alum tested according to the ASTM 6413-99 Vertical flame test method.

FIG. 11 is a photo of the following test:

Wool fabrics treated with PISi-1, Urea, Citric acid and Alum. (Knitted Wool Fabrics (without ARS treatment) treated with PISi-1 and Urea, Citric acid and Alum additives):

| Sample | | After Flame time | After glow | Char Length | Melting/Dripping |
|---|---|---|---|---|---|
| Test Fabrics | 1 | 19.9 − 12 = 7.9 | No | 19.9 | No |
| Wool (not treated with enzymes) | 2 | 12.9 − 12 = 0.9 | No | 12.9 | No |
| (Style # 532) | 3 | 13.0 − 12 = 1.0 | No | 13.0 | No |
| treated with PISi-1, urea, citric acid and alum | 4 | 16.2 − 12 = 4.2 | No | 16.2 | No |

Average Char length = 18.42
Std Deviation = 7.130708

Figure 12:
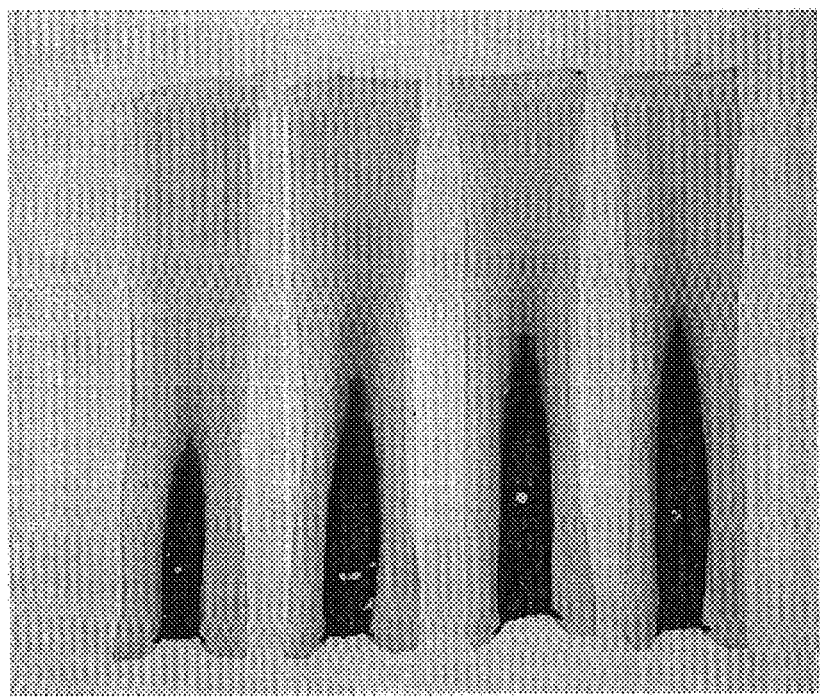
FIG. 12 shows burning of ARS Treated Wool (ESPERASE 8.0L™) treated with PISi-1, urea, citric acid and alum tested according to the ASTM 6413-99 Vertical flame test method.

FIG. 12 is a photo of the following test:

Wool fabrics treated with PISi-1, Urea, Citric acid and Alum. (Knitted Wool Fabrics (with ARS treatment) treated with PISi-1, Urea, Citric acid and Alum additives)

| Sample | | After Flame time | After glow | Char Length | Melting/Dripping |
|---|---|---|---|---|---|
| Test Fabrics | 1 | 11.9 − 12 = 0.0 | No | 9.8 | No |
| ARS Treated Wool | 2 | 12.6 − 12 = 0.6 | No | 11.9 | No |
| ESPERASE 8.0L ™ | 3 | 13.9 − 12 = 1.9 | No | 11.9 | No |
| (Style # 532) treated with PISi-1 and urea, citric acid and alum | 4 | 14.2 − 12 = 2.2 | No | 14.5 | No |

Average Char length = 12.025
Std Deviation = 1.924188

Figure 13:
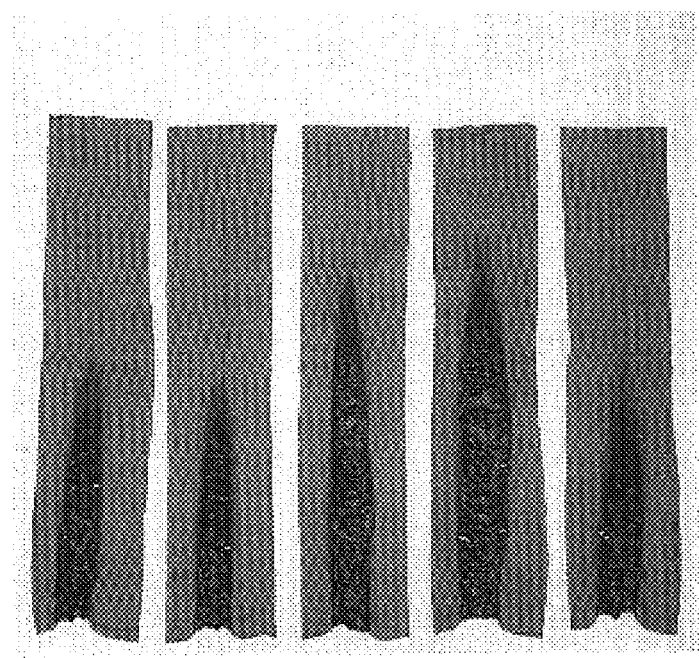
FIG. 13 shows burning of Sextet Fabrics ARS Treated Wool (ESPERASE 8.0L™, Style # 9743) treated with PISi-1, urea, citric acid and alum tested according to the ASTM 6413-99 Vertical flame test method.

FIG. 13 is a photo of the following test:

Wool fabrics treated with PISi-1, Urea, Citric acid and Alum. (Knitted Wool Fabrics (with ARS treatment) treated with PISi-1 and Urea, Citric acid and Alum additives)

| Sample | | After Flame time | After glow | Char Length | Melting/Dripping |
|---|---|---|---|---|---|
| Sextet Fabrics | 1 | 15.6 − 12 = 3.6 | No | 16.4 | No |
| ARS Treated Wool | 2 | 14.1 − 12 = 2.1 | No | 15.5 | No |
| ESPERASE 8.0L ™ | 3 | 20.1 − 12 = 8.1 | No | 20.6 | No |
| (Style # 9743) | 4 | 19.2 − 12 = 7.2 | No | 21.1 | No |
| treated with PISi-1, urea, citric acid and alum | 5 | 13.5 − 12 = 1.5 | No | 15.9 | No |

Average Char length = 17.90

Figure 14:
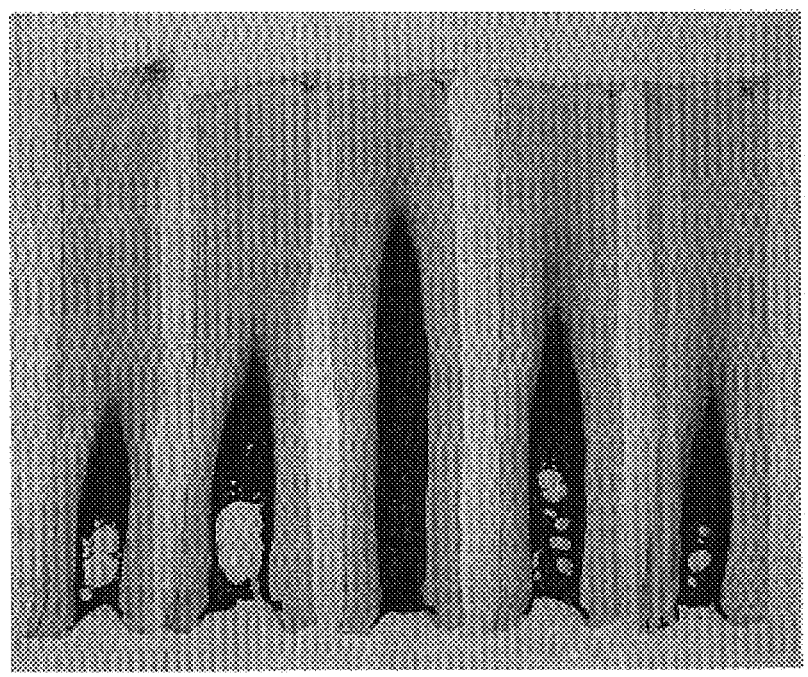
FIG. 14 shows burning of ARS Treated Wool (ESPERASE 8.0L™, Style # 532) treated with polyamic acid (PAA), urea, citric acid and alum tested according to the ASTM 6413-99 Vertical flame test method.

FIG. 14 is a photo of the following test:

Wool Fabrics treated with Polyamic acid (PAA), Urea, Citric acid and Alum

| Sample | | After Flame time | After glow | Char Length | Melting/Dripping |
|---|---|---|---|---|---|
| Test Fabrics | 1 | 13.5 − 12 = 1.5 | No | 15.5 | No |
| ARS Treated Wool | 2 | 13.9 − 12 = 1.9 | No | 18.5 | No |
| ESPERASE 8.0L ™ | 3 | 26.8 − 12 = 14.8 | No | 13.2 | No |
| (Style # 532) | 4 | 15.5 − 12 = 3.5 | No | 19.6 | No |
| treated with PAA, urea, citric acid and alum (no PISi-1) | 5 | 16.1 − 12 = 4.1 | No | 16.1 | No |

Average Char length = 16.58
Std Deviation = 2.531205

Figure 15:
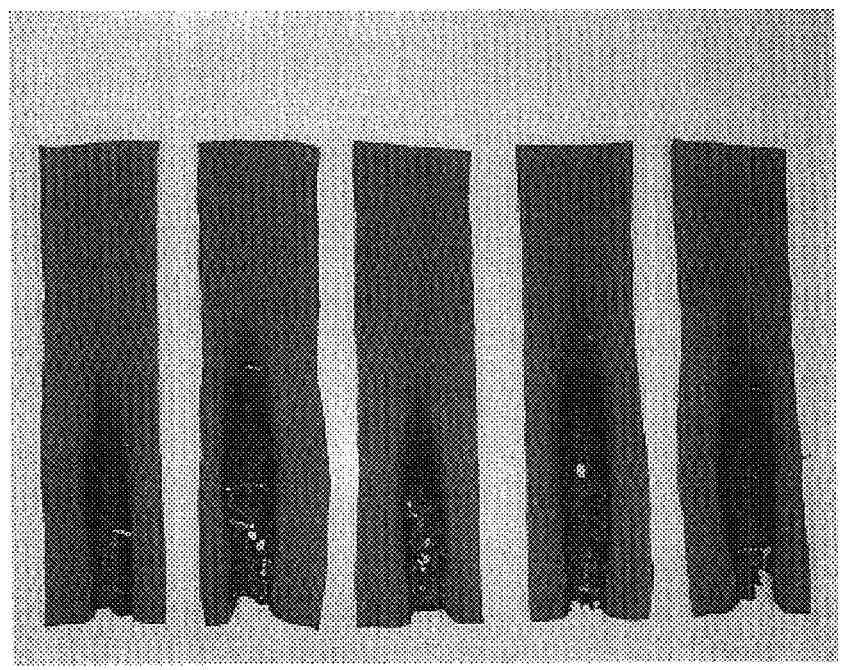
FIG. 15 shows burning of Sextet Fabrics ARS Treated Wool (ESPERASE 8.0L™, Style # 9743) treated with PAA, urea, citric acid and alum tested according to the ASTM 6413-99 Vertical flame test method.

FIG. 15 is a photo of the following test:

Wool Fabrics treated with Polyamic acid, Urea, Citric acid and Alum

| Sample | | After Flame time | After glow | Char Length | Melting/Dripping |
|---|---|---|---|---|---|
| Sextet Fabrics | 1 | 14.4 − 12 = 2.4 | No | 14.0 | No |
| ARS Treated Wool | 2 | 14.6 − 12 = 2.6 | No | 13.3 | No |
| ESPERASE 8.0L ™ | 3 | 11.6 − 12 = 0.0 | No | 25.6 | No |
| (Style # 9743) | 4 | 14.3 − 12 = 2.3 | No | 14.5 | No |
| treated with PAA | 5 | 14.3 − 12 = 2.3 | No | 15.0 | No |

-continued

Wool Fabrics treated with Polyamic acid, Urea, Citric acid and Alum

| Sample | After Flame time | After glow | Char Length | Melting/ Dripping |
|---|---|---|---|---|
| urea, citric acid and alum (no PISi-1) | | | | |

Average Char length = 16.48
Std Deviation = 5.136828

All of the references cited herein are incorporated by reference in their entirety. Also incorporated by reference in their entirety are the following references: U.S. Pat. No. 5,206,337; Arnold, C. A., et al., Polymer Engineering and Science, 29 (20): 1413-1418 (1989); Arnold, C. A., et al., SAMPE Electronic Materials and Processes Proceedings, 3: 198-208, Los Angeles, Calif., Jun. 20-22, 1989; Bott, R. H., et al., The Journal of Adhesion, 23: 67-82 (1987): Bott, R. H., et al., SAMPE Proceedings, Anaheim, Calif., 33:1177-1187, Mar. 7-10, 1988; U.S. Pat. No. 4,903,358; Kaltenecker-Commercon, J. M., et al., Journal of Adhesion, 44: 85-102 (1994); U.S. Pat. No. 4,586,997; U.S. Pat. No. 4,829,131; U.S. Pat. No. 4,973,645; U.S. Pat. No. 4,670,497; Lee, Y. J., et al., J. Adhesion, 55: 165-177 (1995); McGrath, B. E., The Application of Siloxane Modified Polyimides as High Performance Textile Coatings, unpublished M. S. Thesis, Virginia Polytechnic Institute and State University, May, 1989; McGrath, J. E., et al., Advances in Polymer Science, 141: 61(1999); U.S. Pat. No. 4,795,680; U.S. Pat. No. 5,660,932; Rogers, M. E., et al., SAMPE Electronics Conference Proceedings, 6: 535-546, Baltimore, Md., Jun. 22-25, 1992; U.S. Pat. No. 6,632,523; Stern, S. A., and R. Vaidyanathan, Journal of Membrane Science, 49: 1990, 1-14; Summer, J. D., et al., SAMPE Proceedings, Anaheim, Calif., 32: 613-623, Apr. 6-9, 1987; U.S. Pat. No. 4,701,511; U.S. patent 2002/0058149; Yoon, T. H., et al., The Journal of Adhesion, 39, 15-27, (1992).

Also incorporated by reference in their entirety are the following: U.S. Provisional Application No. 60/483,991 filed 30 Jun. 2003; U.S. Provisional Application No. 60/495,395 filed 15 Aug. 2003; U.S. patent application Ser. No. 10/730,208 filed 8 Dec. 2003; U.S. Patent Application publication 2004/0261192 A1.

Thus, in view of the above, the present invention concerns (in part) the following:

A method of inhibiting (at least partially) the burning of natural fibers, synthetic fibers, or mixtures thereof, or fabrics or yarns composed of (or consisting essentially of or consisting of) natural fibers, synthetic fibers, or blends thereof, comprising (or consisting essentially of or consisting of) treating (e.g., applying PAA or PISi or mixtures thereof to the fabric, for example by soaking the fabric in a solution of emulsion containing PAA or PISi or mixtures thereof) said fibers or fabric or yarn with polyamic acid or at least one polyimidesiloxane or mixtures thereof.

A product produced by the above method.

Natural fibers, synthetic fibers, or mixtures thereof, or fabrics or yarns composed of natural fibers, synthetic fibers, or blends thereof, treated with at least one member of the group consisting of polyamic acid, polyimidesiloxane, and mixtures thereof.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method of inhibiting the burning of natural fibers, synthetic fibers, or mixtures thereof, or fabrics or yarns composed of natural fibers, synthetic fibers, or blends thereof, comprising treating said fibers or fabric or yarn with at least one member selected from group consisting of polyamic acid, polyimidesiloxane, and mixtures thereof; wherein said polyamic acid is

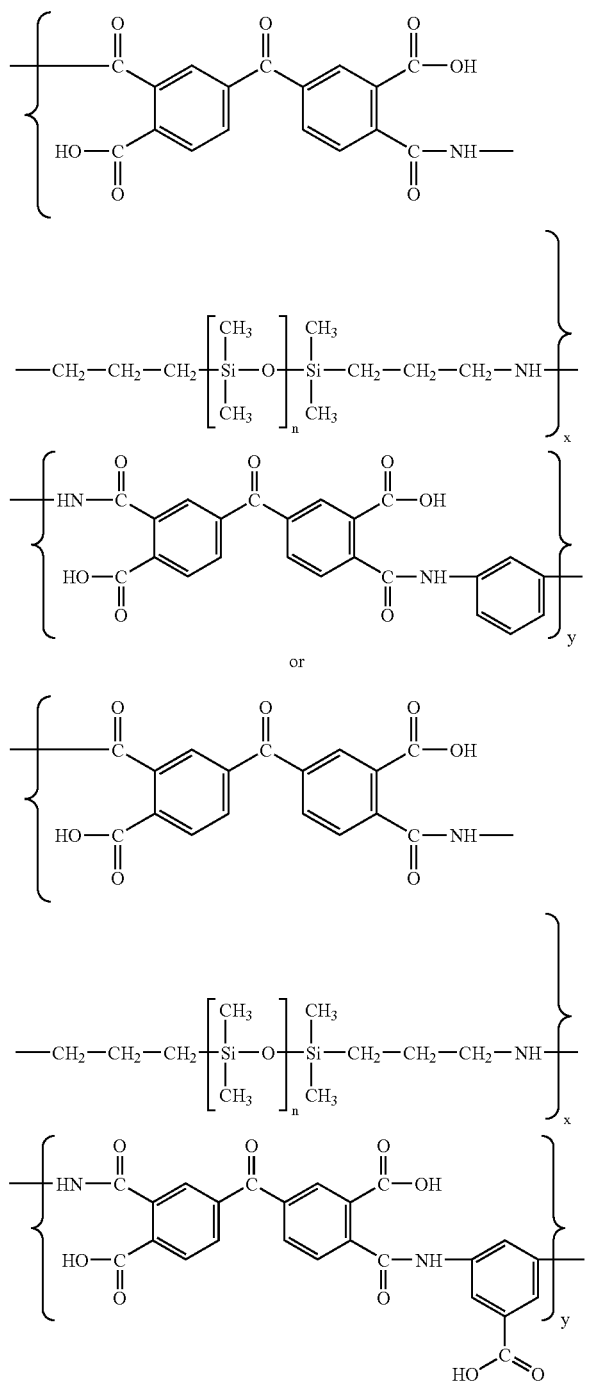

or mixtures thereof, wherein "n" is an integer from 1 to 10 and "x" and "y" are from 0 to 1 and x+y=1; and wherein said polyimidesiloxane is
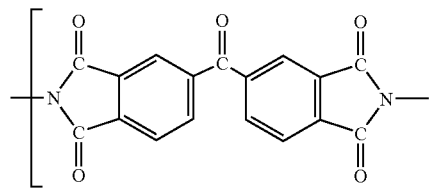
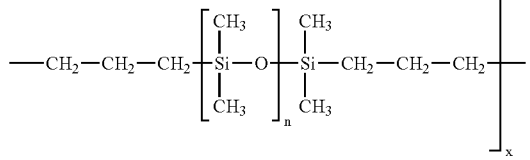
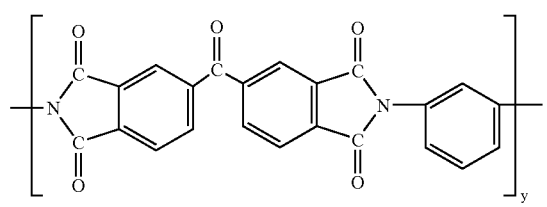
or
-continued
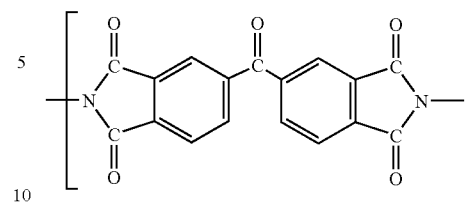
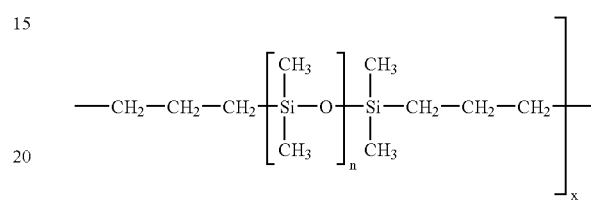
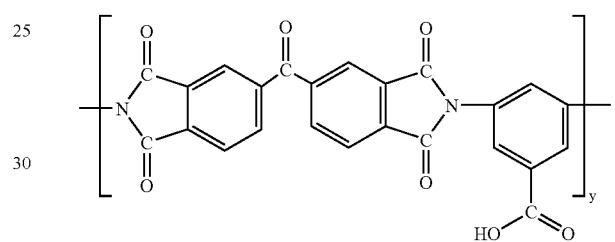
or mixtures thereof, wherein "n" is an integer from 1 to 10 and "X" and "y" are from 0 to 1 and x+y=1.
2. The method according to claim 1, wherein said polyamic acid is
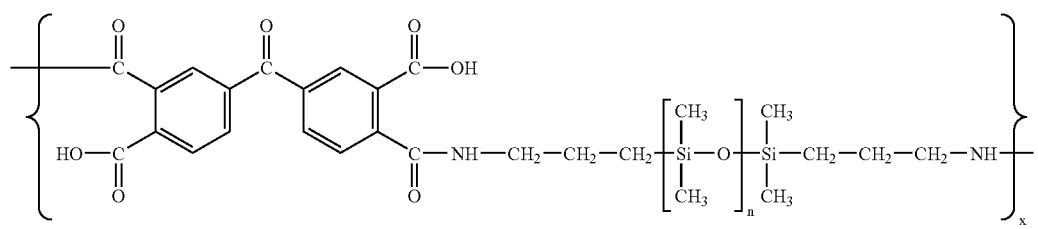
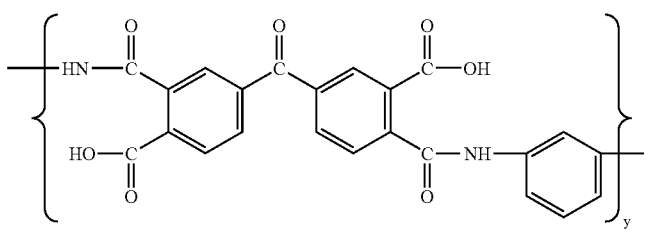

wherein "n" is an integer from 1 to 10 and "x" and "y" are from 0 to 1 and x+y=1.

3. The method according to claim 1, wherein said polyamic acid is

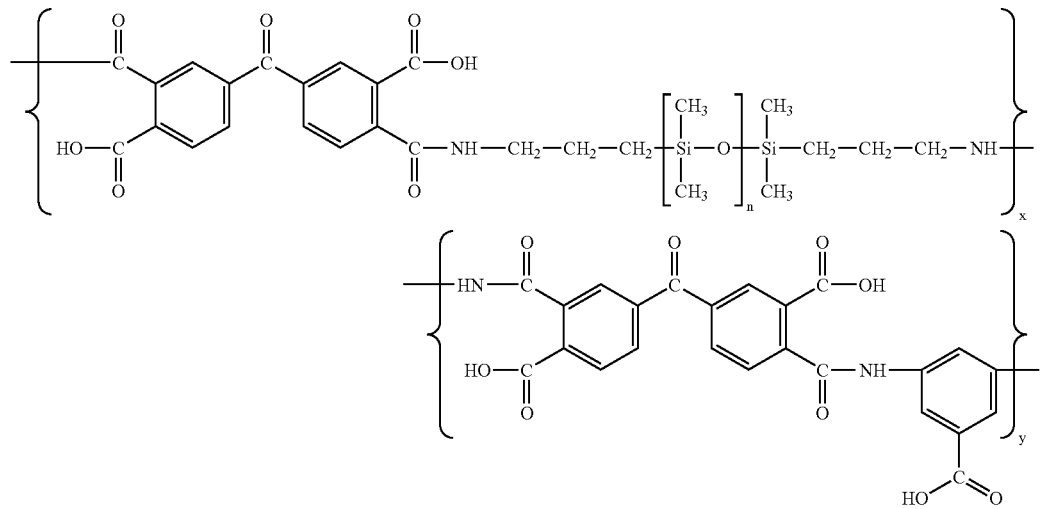

wherein "n" is an integer from 1 to 10 and "x" and "y" are from 0 to 1 and x+y=1.

4. The method according to claim 1, wherein said polyimidesiloxane is

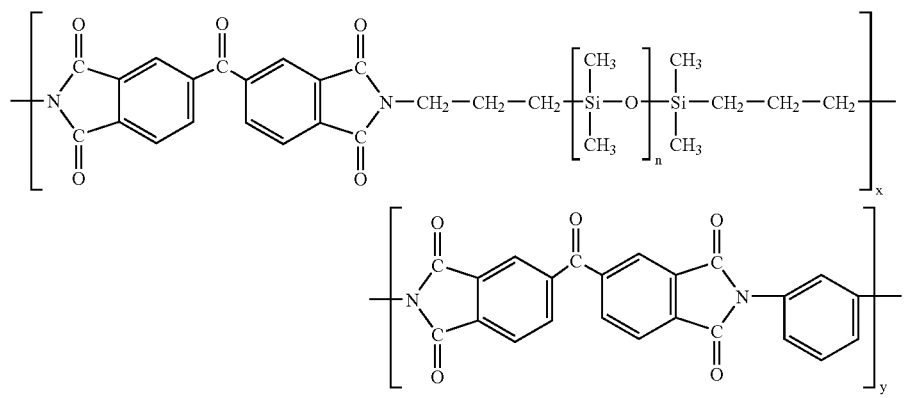

wherein "n" is an integer from 1 to 10 and "y" are from 0 to 1 and x+y=1.

5. The method according to claim 1, wherein said polyimidesiloxane is

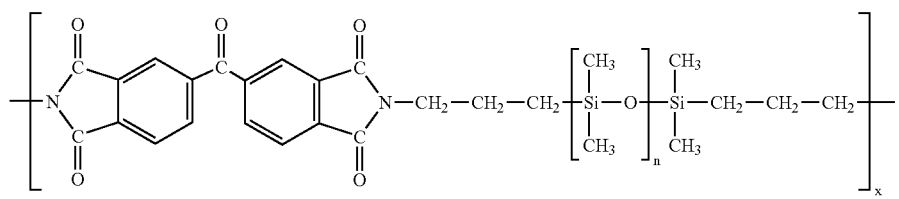

-continued

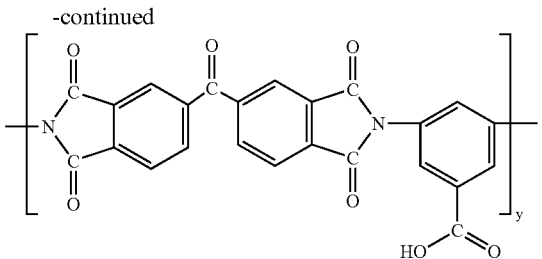

wherein "n" is an integer from 1 to 10 and "x" and "y" are from 0 to 1 and x+y=1.

6. The method according to claim 1, comprising treating said fibers or fabric or yarn with a solution or emulsion comprising at least one member selected from the group consisting of polyamic acid, polyimidesiloxane, and mixtures thereof, and water, optionally citric acid, optionally potassium aluminum sulfate, optionally urea, and optionally a nonionic surfactant; wherein said polyamic acid is

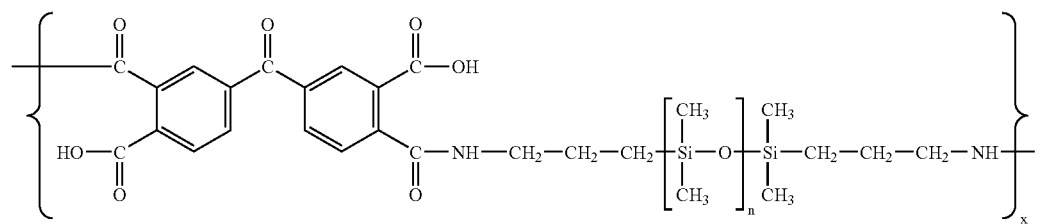

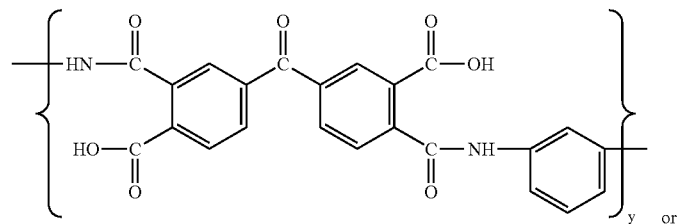

or

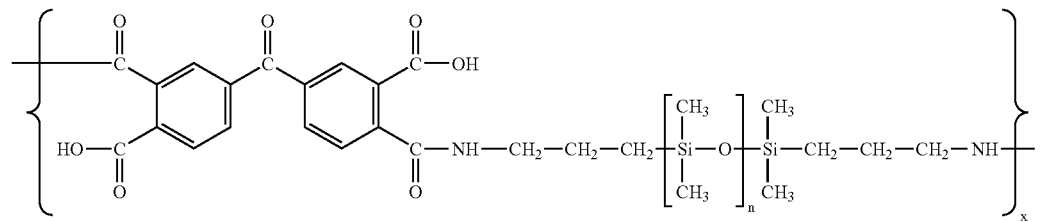

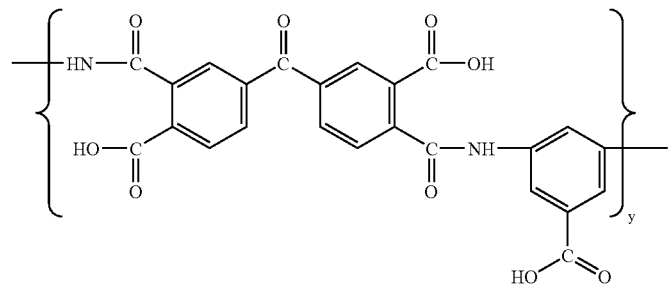

or mixtures thereof, wherein "n" is an integer from 1 to 10 and "x" and "y" are from 0 to 1 and x+y=1; and wherein said polyimidesiloxane is

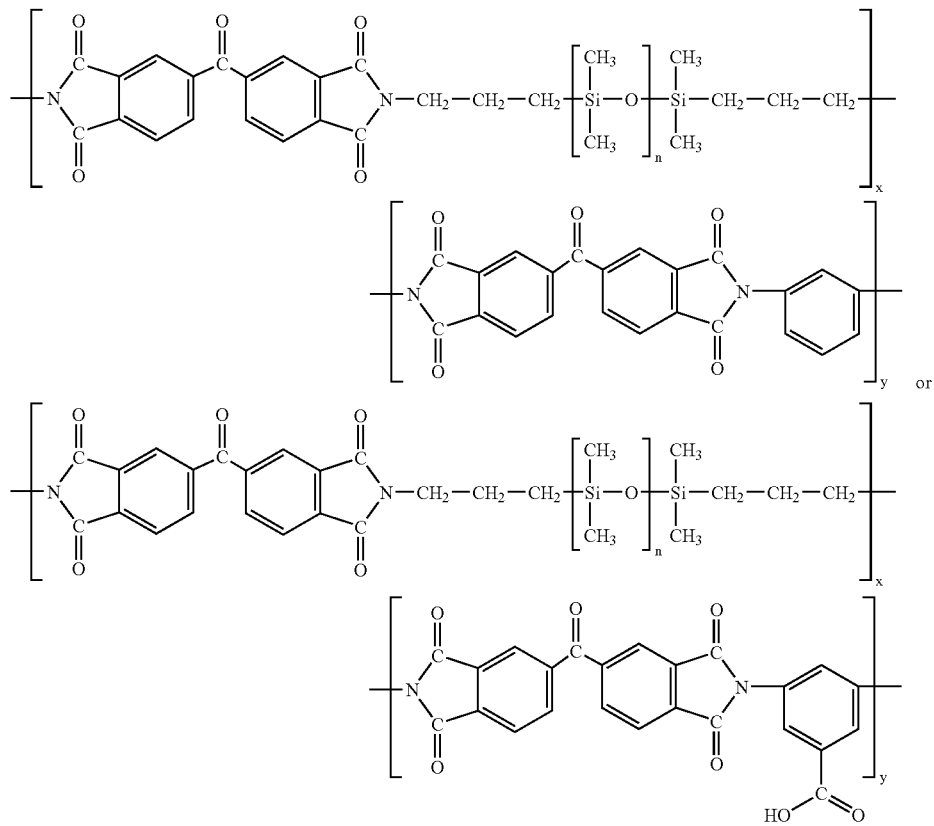

or mixtures thereof wherein "n" is an integer from 1 to 10 and "x" and "y" are from 0 to 1 and x+y=1.

7. The method according to claim 1, consisting essentially of treating said fibers or fabric or yarn with a solution or emulsion comprising at least one member selected from the group consisting of polyamic acid, polyimidesiloxane, and mixtures thereof, and water, optionally citric acid, optionally potassium aluminum sulfate, optionally urea, and optionally a nonionic surfactant; wherein said polyamic acid is

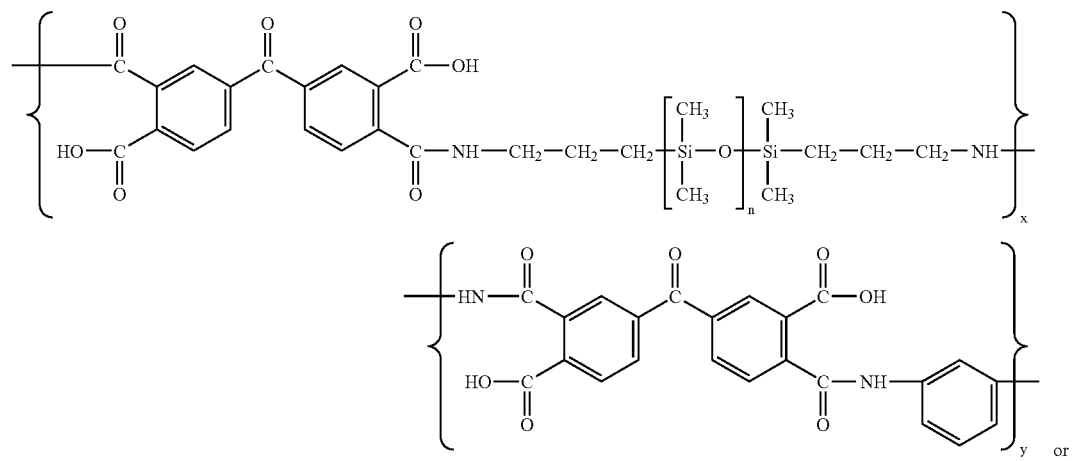

-continued
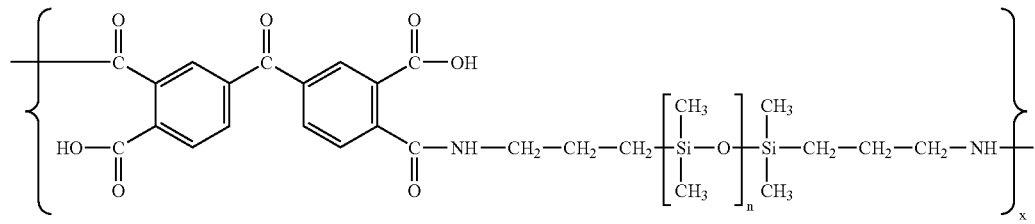
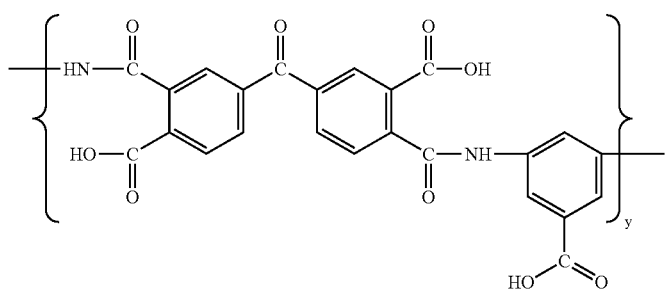
or mixtures thereof, wherein "n" is an integer from 1 to 10 and "x" and "y" are from 0 to 1 and x+y=1; and wherein said polyimidesiloxane is
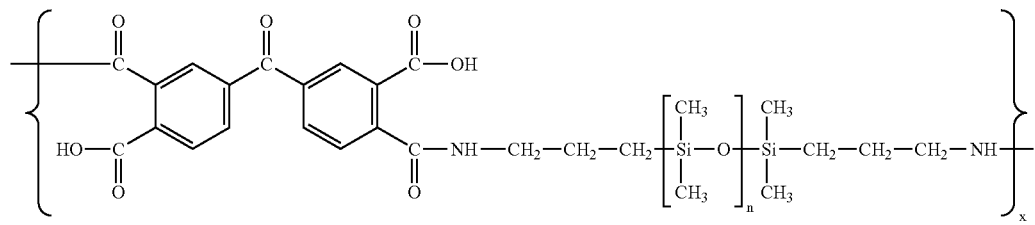
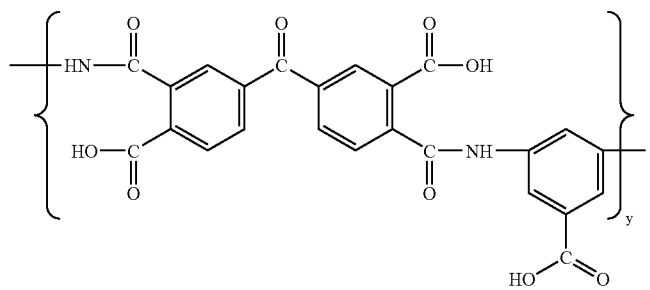

or mixtures thereof wherein "n" is an integer from 1 to 10 and "x" and "y" are from 0 to 1 and x+y=1.

8. A product produced by the method according to claim 1.

9. Natural fibers, synthetic fibers, or mixtures thereof, or fabrics or yarns composed of natural fibers, synthetic fibers, or blends thereof, treated with at least one member selected from the group consisting of polyamic acid, polyimidesiloxane, and mixtures thereof; wherein said polyamic acid is

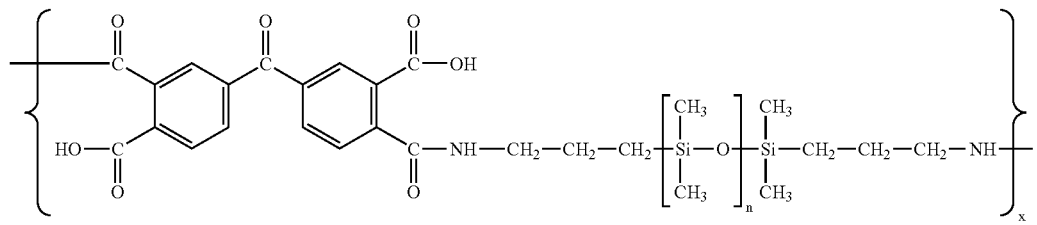

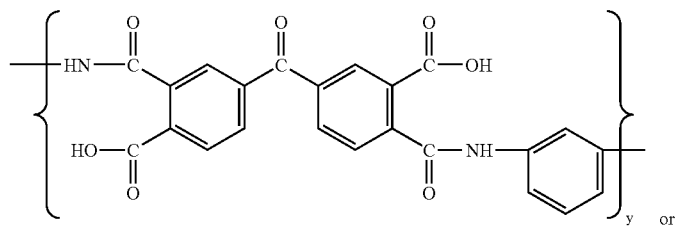
or

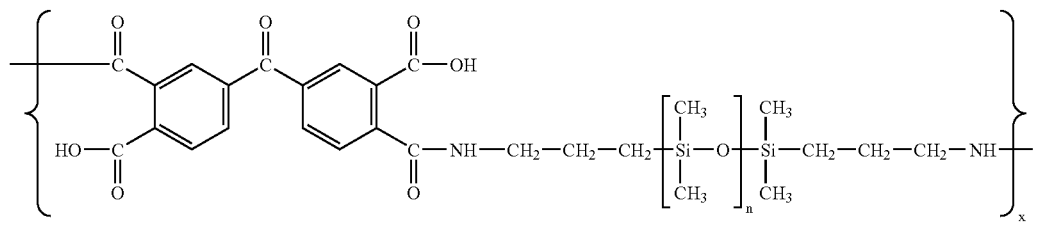

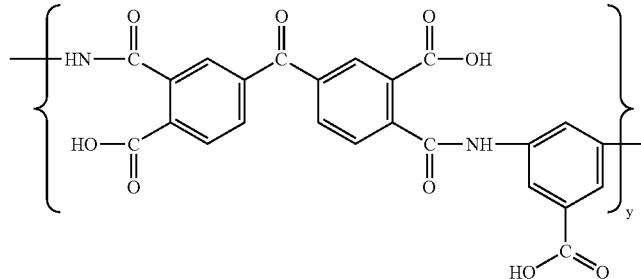

or mixtures thereof, wherein "n" is an integer from 1 to 10 and "x" and "y" are from 0 to 1 and x+y=1; and wherein said polyimidesiloxane is

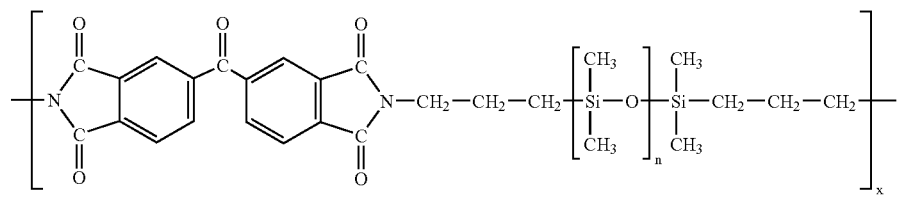

-continued
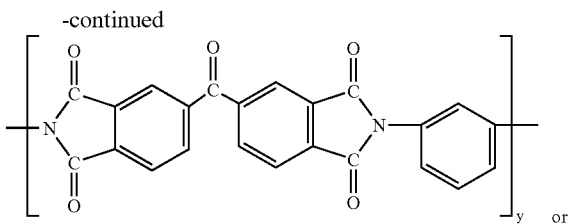 or
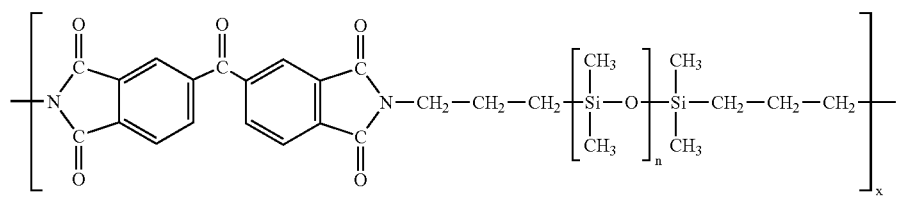
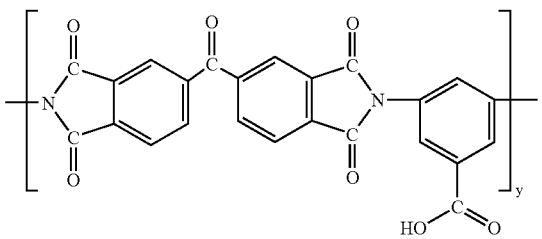
or mixtures thereof, wherein "n" is an integer from 1 to 10 and "x" and "y" are from 0 to 1 and x+y=1.
10. The natural fibers, synthetic fibers, or mixtures thereof, or fabrics or yarns composed of natural fibers, synthetic fibers, or blends thereof according to claim 9, wherein said polyamic acid is
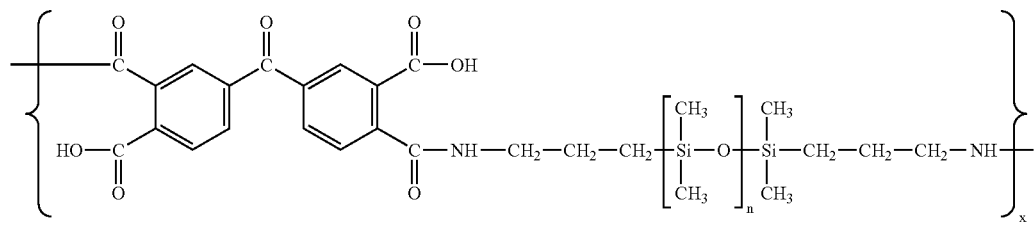
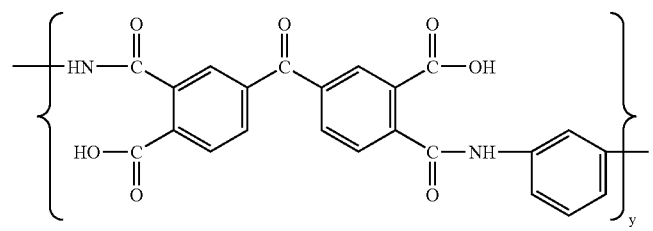

wherein "n" is an integer from 1 to 10 and "x" and "y" are from 0 to 1 and x+y=1.

11. The natural fibers, synthetic fibers, or mixtures thereof, or fabrics or yarns composed of natural fibers, synthetic fibers, or blends thereof according to claim 9, wherein said polyamic acid is

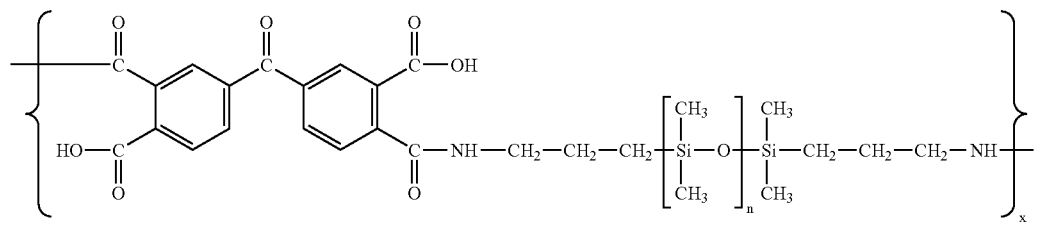

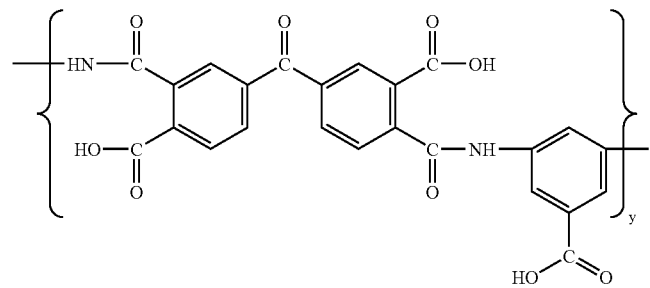

wherein "n" is an integer from 1 to 10 and "x" and "y" are from 0 to 1 and x+y=1.

12. The natural fibers, synthetic fibers, or mixtures thereof, or fabrics or yarns composed of natural fibers, synthetic fibers, or blends thereof according to claim 9, wherein said polyimidesiloxane is

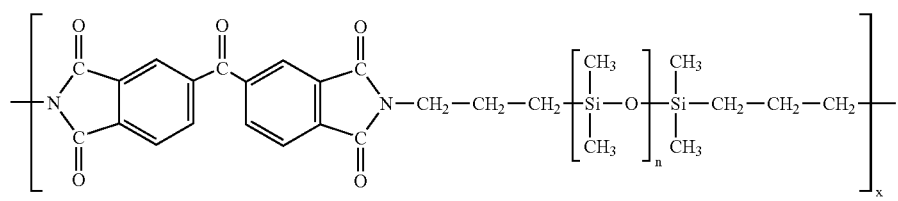

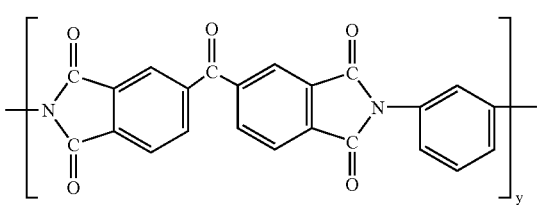

wherein "n" is an integer from 1 to 10 and "x" and "y" are from 0 to 1 and x+y=1.

13. The natural fibers, synthetic fibers, or mixtures thereof, or fabrics or yarns composed of natural fibers, synthetic fibers, or blends thereof according to claim 9, wherein said polyimidesiloxane is

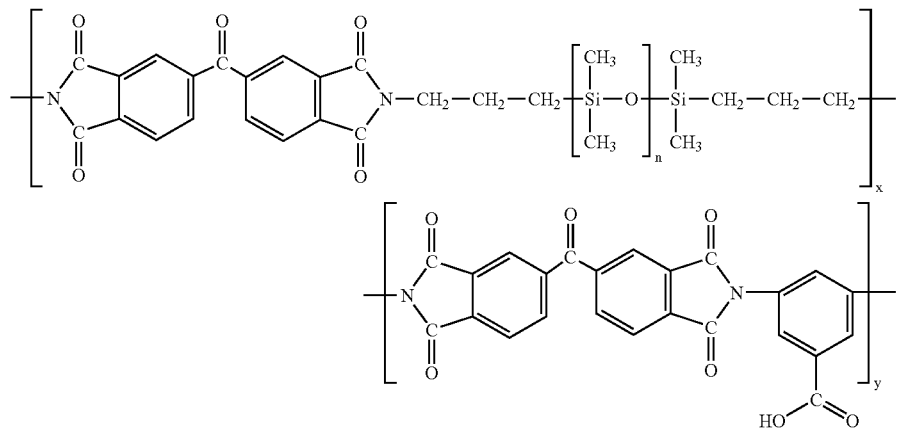

wherein "n" is an integer from 1 to 10 and "x" and "y" are from 0 to 1 and x+y=1.

14. The natural fibers, synthetic fibers, or mixtures thereof, or fabrics or yarns composed of natural fibers, synthetic fibers, or blends thereof according to claim 9, wherein said natural fibers, synthetic fibers, or mixtures thereof, or fabrics or yarns composed of natural fibers, synthetic fibers, or blends thereof are treated with at least one member selected from the group consisting of polyamic acid, polyimidesiloxane, and mixtures thereof, and water, optionally citric acid, optionally potassium aluminum sulfate, optionally urea, and optionally a nonionic surfactant; wherein said polyamic acid is

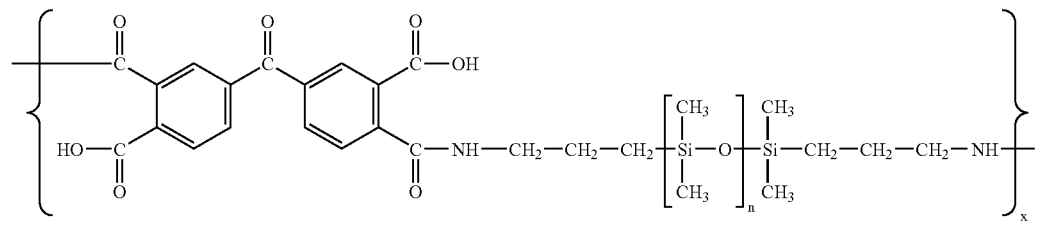

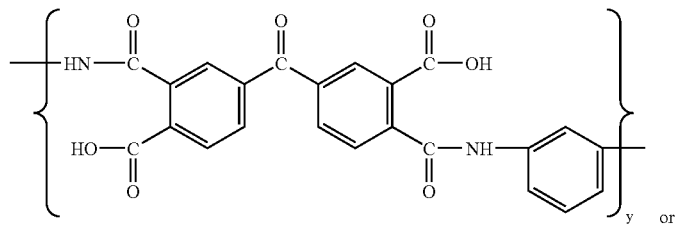

or

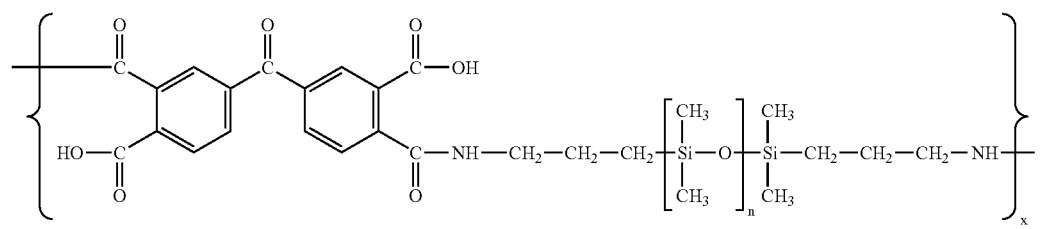

-continued
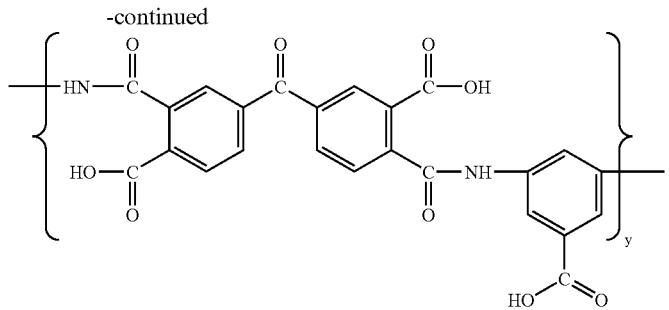
or mixtures of wherein "n" is an integer from 1 to 10 and "x" and "y" are from 0 to 1 and x+y=1; and wherein 8 aid polyimidesiloxane is
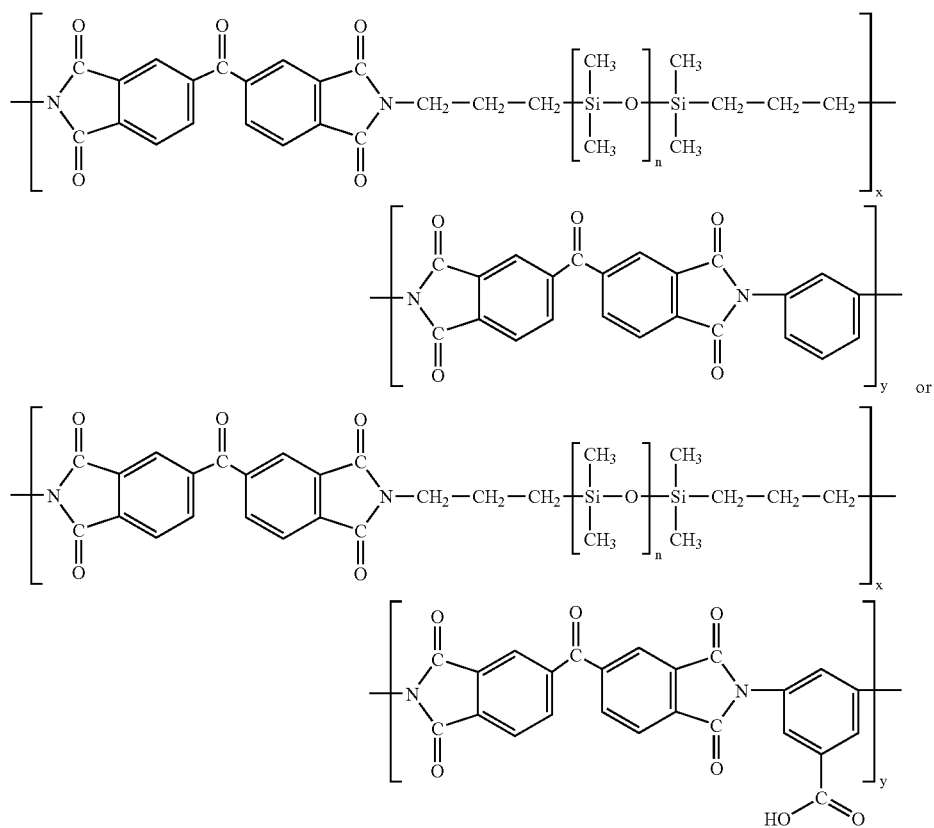
or mixtures thereof, wherein "n" is an integer from 1 to 10 and "x" and "y" are from 0 to 1 and x+y=1.
* * * * *